(12) United States Patent
Tanaka

(10) Patent No.: US 7,145,128 B2
(45) Date of Patent: Dec. 5, 2006

(54) LIGHT RECEIVING DEVICE FOR OPTICAL ENCODER, AND OPTICAL ENCODER, INCLUDING FIRST AND SECOND PHOTODIODES ARRANGED IN PERPENDICULAR DIRECTIONS AND IRRADIATED THROUGH OPENINGS OF A LIGHT SHIELDING LAYER

(75) Inventor: Akihiro Tanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/060,546

(22) Filed: Feb. 18, 2005

(65) Prior Publication Data

US 2006/0102832 A1    May 18, 2006

(30) Foreign Application Priority Data

Nov. 12, 2004   (JP)   ............................. 2004-329704

(51) Int. Cl.
*G01D 5/34*   (2006.01)
(52) U.S. Cl. ................................................ 250/231.13
(58) Field of Classification Search .............................
250/231.13–231.18
See application file for complete search history.

(56) References Cited

U.S. PATENT DOCUMENTS

| 4,691,101 A | 9/1987 | Leonard ................. 250/231.16 |
| 4,904,861 A | 2/1990 | Epstein et al. ........... 250/214 C |
| 6,906,311 B1 * | 6/2005 | Kojima .................... 250/231.16 |
| 2004/0200958 A1 | 10/2004 | Tanaka et al. ........... 250/231.13 |

FOREIGN PATENT DOCUMENTS

JP    2001-99684    4/2001

* cited by examiner

*Primary Examiner*—Thanh X. Luu
(74) *Attorney, Agent, or Firm*—Oblon, Spivak, McClelland, Maier & Neustadt, P.C.

(57) ABSTRACT

A light receiving device for an optical encoder comprises: a plurality of first photodiodes juxtaposed in a first direction and extending in a second direction that is generally vertical to the first direction; and a light shielding layer. The light shielding layer is are provided on the plurality of first photodiodes, and have openings provided so that, when a scale having a transmitting pattern and a light shielding pattern is moved along the second direction, at least one and at least another of the plurality of first photodiodes are sequentially irradiated with light transmitted through the transmitting pattern.

18 Claims, 28 Drawing Sheets

LIGHT RECEIVING DEVICE FOR OPTICAL ENCODER, AND OPTICAL ENCODER, INCLUDING FIRST AND SECOND PHOTODIODES ARRANGED IN PERPENDICULAR DIRECTIONS AND IRRADIATED THROUGH OPENINGS OF A LIGHT SHIELDING LAYER

CROSS-REFERENCE TO RELATED APPLICATIONS

This application is based upon and claims the benefit of priority from the prior Japanese Patent Application No. 2004-329704, filed on Nov. 12, 2004; the entire contents of which are incorporated herein by reference.

BACKGROUND OF THE INVENTION

The invention relates to a light receiving device for an optical encoder, and an optical encoder. In particular, the invention relates to a light receiving device for an optical encoder using photodiodes and an optical encoder equipped with the same.

An optical encoder comprises a light emitting unit and a light receiving unit that are oppositely arranged. The optical encoder is configured so that it can detect signal changes when a scale appropriately provided with a transparent pattern and a light shielding pattern is passed between the light emitting unit and the light receiving unit. The optical encoder can be used as a position detecting means with a required resolution by appropriately setting pitches of the light receiving unit and the scale (e.g., Japanese Laid-Open Patent Application 2002-340669). Optical encoders are used for various applications such as detecting the position of a print head in a printer and controlling the amount of paper feed in a copier.

However, in conventional optical encoders, the size of the photodiode in the light receiving unit must be very small for enhancing the spatial resolution, which causes a problem that they are not easy to manufacture.

In addition, in conventional optical encoders, the photocurrent waveform obtained from the light receiving device has a high DC component, which causes a problem that the dynamic range is narrowed.

The present invention provides a light receiving device for an optical encoder, and an optical encoder, being easy to enhance spatial resolution and also capable of reducing the DC component in photocurrent.

SUMMARY OF THE INVENTION

According to an aspect of the invention, there is provided a light receiving device for an optical encoder comprising: a plurality of first photodiodes juxtaposed in a first direction and extending in a second direction that is generally vertical to the first direction; and light shielding layers provided on the plurality of first photodiodes, respectively, the light shielding layers having openings provided so that, when a scale having a transmitting pattern and a light shielding pattern is moved along the second direction, at least one and at least another of the plurality of first photodiodes are sequentially irradiated with light transmitted through the transmitting pattern. According to other aspect of the invention, there is provided an optical encoder comprising: a light emitting unit; and a light receiving unit provided opposite to the light emitting unit, the light receiving unit having the light receiving device including: a plurality of first photodiodes juxtaposed in a first direction and extending in a second direction that is generally vertical to the first direction; and a light shielding layer provided on the plurality of first photodiodes, the light shielding layer having openings provided so that, when a scale having a transmitting pattern and a light shielding pattern is moved along the second direction, at least one and at least another of the plurality of first photodiodes are sequentially irradiated with light transmitted through the transmitting pattern.

BRIEF DESCRIPTION OF THE DRAWINGS

The present invention will be understood more fully from the detailed description given here below and from the accompanying drawings of the embodiments of the invention. However, the drawings are not intended to imply limitation of the invention to a specific embodiment, but are for explanation and understanding only.

In the drawings.

DETAILED DESCRIPTION

Embodiments of the invention will now be described with reference to the drawings.

Figure 1:
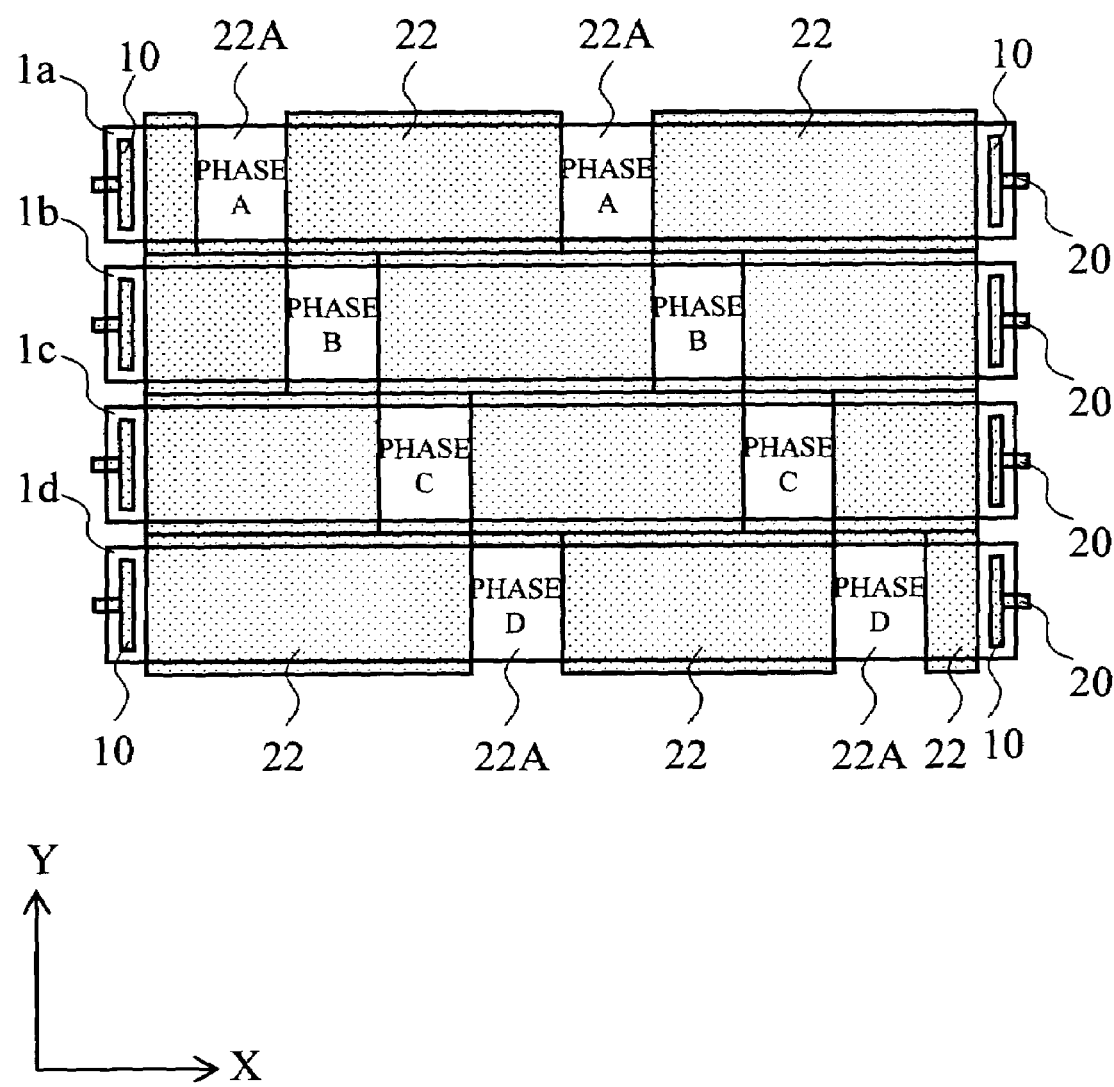
FIG. 1 is a plan perspective view illustrating the configuration of a light receiving device of an optical encoder according to a first embodiment of the invention.

FIG. 1 is a plan perspective view illustrating the configuration of a light receiving device of an optical encoder according to a first embodiment of the invention.

Figure 2:
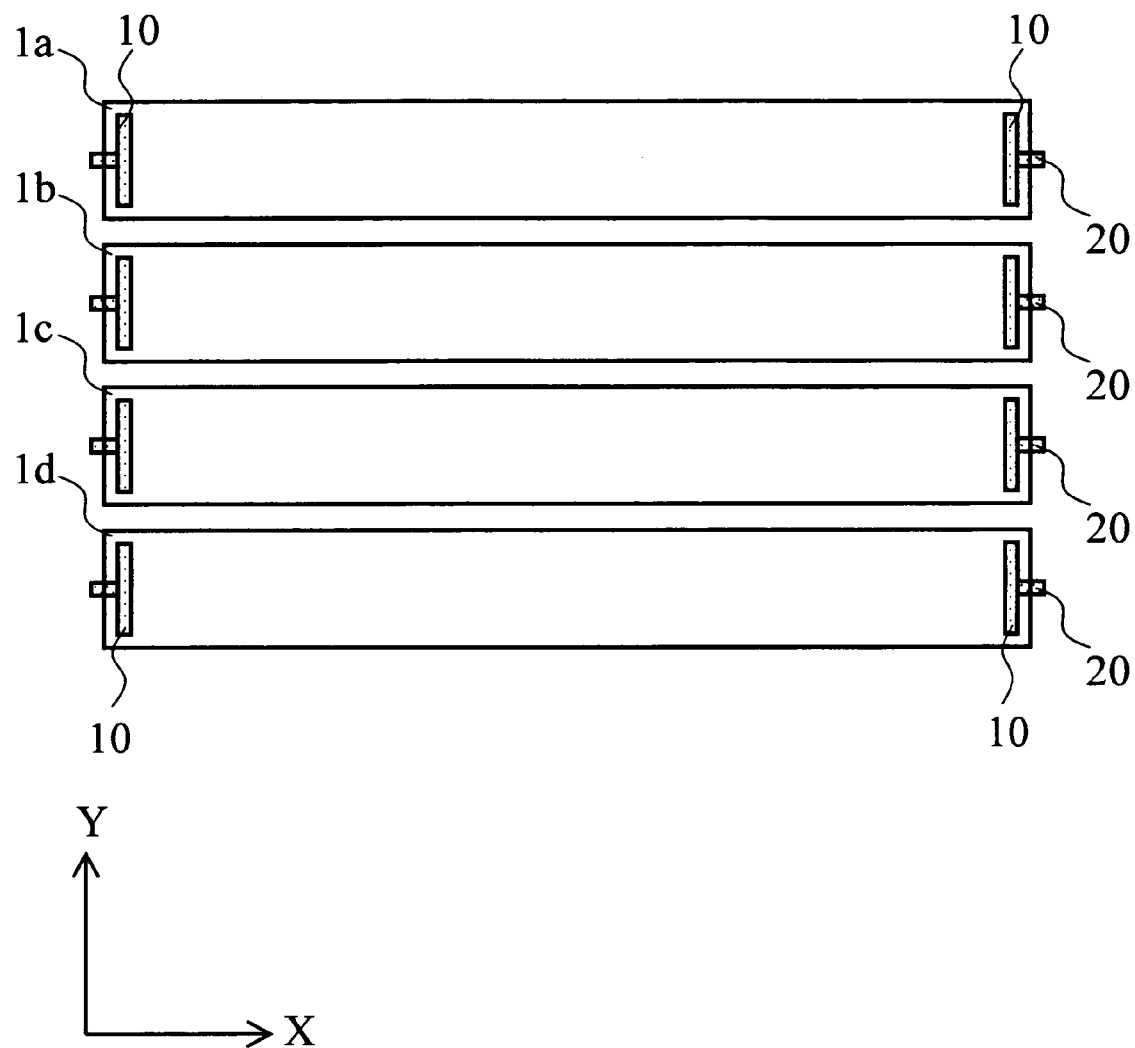
FIG. 2 is a plan view illustrating a light receiving device of a specific example of the invention from which light shielding layers are removed.

FIG. 2 is a plan view illustrating a light receiving device of this specific example from which light shielding layers are removed.

More specifically, the light receiving device of this specific example comprises first photodiodes 1a to 1d in a generally striped configuration extending in a first direction (x-direction in FIGS. 1 and 2). As described later in detail, these photodiodes 1a to 1d are formed by growing epitaxial layers on a semiconductor layer or diffusing impurities in a planar configuration.

A metal wiring 20 is connected via a contact 10 to both ends of the photodiodes 1a to 1d.

As shown in FIG. 1, light shielding layers 22 are provided on the first photodiodes 1a to 1d. The light shielding layer 22 can be formed, for example, from the same metal layer as the metal wiring 20. In this respect, it is advantageous to connect the light shielding layers 22 to ground potential because a shielding effect is also achieved. The light shielding layer 22 has openings 22A formed at a predetermined pitch. It should be noted that in an actual light receiving device, the photodiodes extend in the x-direction and are provided with far more openings 22A than as shown. In the present application, however, only two cycles out of these many openings 22A are shown for convenience. In the specific example shown in FIG. 1, the openings 22A provided for the first photodiode 1a are matched with the pitch of the light/dark pattern of the scale described later in detail. Similarly, the first photodiodes 1b, 1c, and 1d are provided with openings 22A at the same pitch with respective different phases. In this specific example, four phases A to D are assigned to the four photodiodes 1a to 1d, respectively.

The pitch of the openings 22A provided for each of the photodiodes 1a to 1d is preferably matched with the pitch of the light/dark pattern of the scale described later in detail. However, the openings 22A are not required to be identical to the light/dark pattern of the scale. It is sufficient that the openings 22A are matched with the spatial distribution of optical intensity on the light receiving surface of the light receiving device formed by light passed through the light/dark pattern of the scale.

Figure 3:
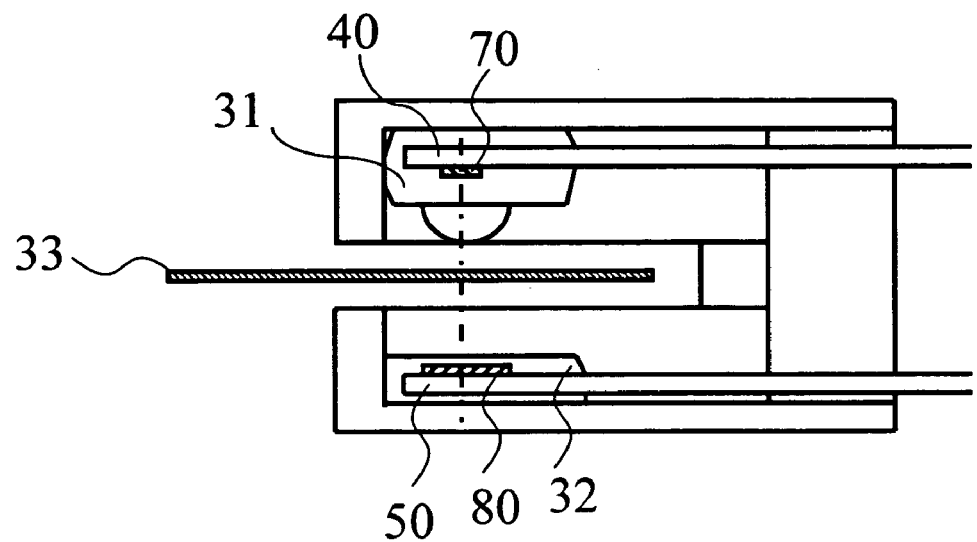
FIG. 3 is a schematic view illustrating a cross-sectional structure of a relevant part of an optical encoder.

FIG. 3 is a schematic view illustrating a cross-sectional structure of a relevant part of an optical encoder equipped with such a light receiving device.

In the optical encoder shown in FIG. 3, a light emitting unit 31 and a light receiving unit 32 are oppositely arranged. The light emitting unit 31 is configured so that, for example, an LED (light emitting diode) 70 is mounted at the tip of a lead frame 40 and its periphery is molded as appropriate with resin. The light receiving unit 32 is configured so that a light receiving device 80 is mounted at the tip of a lead frame 50 and its periphery is molded as appropriate with resin. A scale 33 is inserted between the light emitting unit 31 and light receiving unit 32. Relative displacement between the scale 33 and the encoder is detected.

Figure 4:
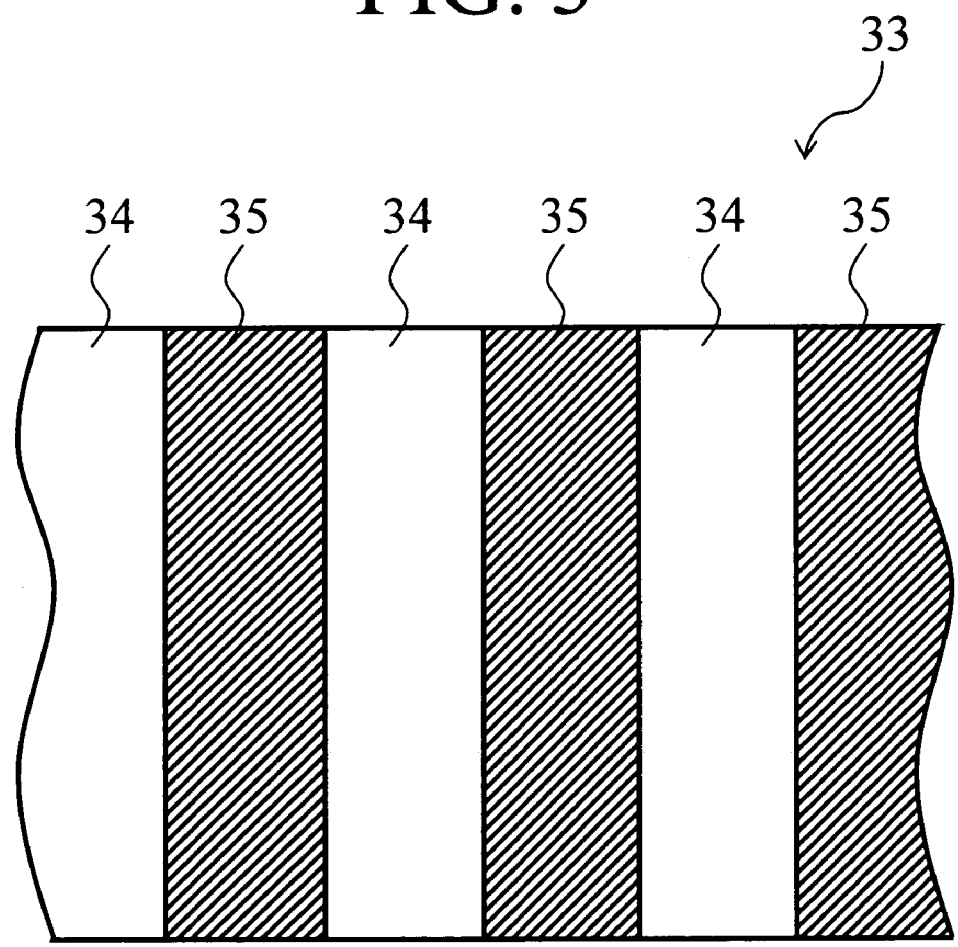
FIG. 4 is a schematic plan view illustrating part of a scale.

FIG. 4 is a schematic plan view illustrating part of a scale. As shown in this figure, the scale 33 is alternately provided with transmitting pattern sections 34 for transmitting light and light shielding pattern sections 35 for shielding light. The pitch of these pattern sections 34 and 35 is generally matched with the pitch of the array of openings 22A in the light shielding layer 22.

Figure 5:
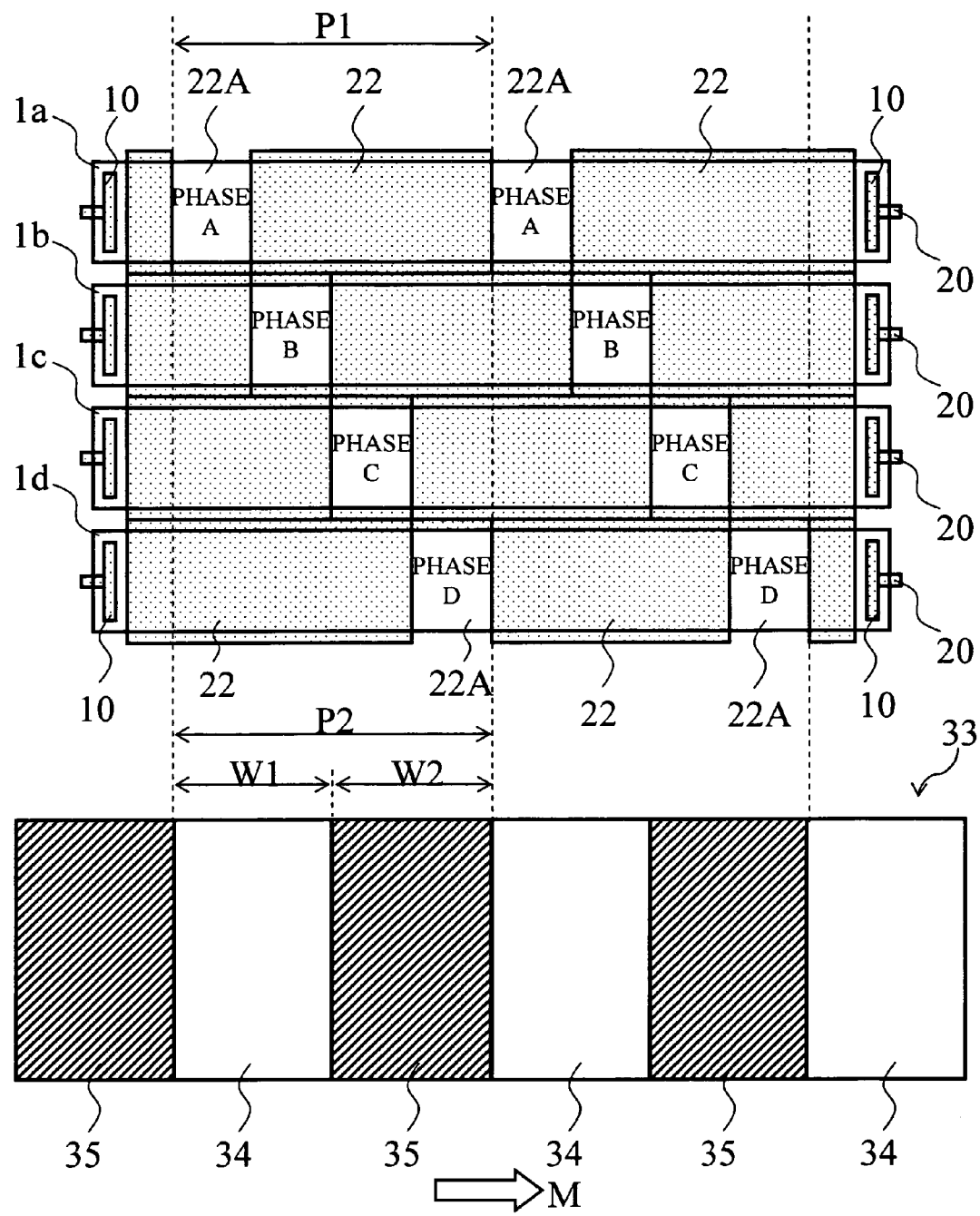
FIG. 5 is a schematic view illustrating the relationship between the opening 22A of the light receiving device and the pitch of the scale 33 of the embodiment of the invention.

FIG. 5 is a schematic view illustrating the relationship between the opening 22A of the light receiving device and the pitch of the scale 33 of this embodiment. It should be noted that this figure shows the light receiving device in juxtaposition with the scale 33 for convenience of description. However, in actual operation, as illustrated in FIG. 3, they are arranged so that the scale 33 is passed above the light receiving device. Furthermore, the scale 33 has a width (vertical width in FIG. 5) such that it entirely covers the light receiving surface of the light receiving device.

With regard to each of the photodiodes 1a to 1d, the pitch of the openings 22A is matched with the pitch of the light/dark pattern of the scale 33. For example, the pitch P1 of the openings 22A provided for the photodiode 1a is the same as the pitch P2 of the transmitting pattern sections 34 and the light shielding pattern sections 35 of the scale 33. The openings 22A provided for each of the photodiodes 1b to 1d are also formed at the same pitch as the pitch P2 of the light/dark pattern of the scale 33.

A relative displacement between the light receiving device and the scale 33 changes photocurrent signals obtained from the photodiodes 1a to 1d, respectively. The amount of displacement can be determined by examining this change. Specifically, in the specific example shown in FIG. 5, the width W1 of the transmitting pattern section 34 of the scale 33 is the same as the width W2 of the light shielding pattern section 35, and twice the width of the opening 22A. When the scale 33 is moved in the direction of arrow M, the light/dark pattern made of the transmitting pattern sections 34 and the light shielding pattern sections 35 is moved in the direction of arrow M on the light receiving device. The opening 22A is then irradiated in the sequence of phase A→phase B→phase C→phase D. Undulations of photocurrent signals are observed by each of the photodiodes 1a to 1d. At this time, given the width W1 of the transmitting pattern section 34 being the same as the width W2 of the light shielding pattern section 35, the duration that each opening 22A is irradiated (light duration) is equal to the duration that the opening 22A is not irradiated (dark duration). That is, an amplitude signal having a duty cycle of 1 is obtained. The undulations of these photocurrent signals have phase differences shifted by 90 degrees relative to each other for the photodiodes 1a to 1d. The moving direction and moving velocity (amount of movement) of the scale 33 can be detected by examining the undulations of the photocurrent signals.

According to this embodiment, the resolution of the encoder is determined by the pitch of the openings 22A provided in the light shielding layer 22. Advantageously, there is no need for finely partitioning the diffusion and epitaxial region. More specifically, partitioning of the diffusion and epitaxial region in the semiconductor layer limits a minimum dimension from the viewpoint of processing, and thus fine partitioning is not easy. In contrast, in this embodiment, the resolution of the encoder can be determined by the size and pitch of the openings 22A provided in the light shielding layer 22. Since the light shielding layer 22 can be formed from the same metal layer as the metal wiring 20, the opening 22A can be formed on the basis of a fine design rule (minimum dimension) similar to that of the metal wiring. Therefore, the resolution of the encoder can be highly enhanced.

In addition, it is advantageous to form the light shielding layer 22 from the same metal layer as the metal wiring and connect it to ground potential because a shielding effect for the photodiodes 1a to 1d is also achieved.

Furthermore, according to this embodiment, variations in the output current can be suppressed while simplifying the structure of the photodiodes. More specifically, fine separation of photodiodes requires forming wirings to the respective photodiodes, which makes the wiring structure complex. In contrast, in this embodiment, the number of photodiodes can be reduced to the number of phases to be detected (or an integer multiple thereof). For example, in the light receiving device illustrated in FIGS. 1 to 5, four-phase (phases A to D) photocurrent signals can be detected by using the four photodiodes 1a to 1d. That is, the wiring structure can be significantly simplified.

When a large number of photodiodes with small sizes are formed, variations of process conditions such as the diffusion condition may also cause variations in their photocurrent output. In contrast, according to this embodiment, large photodiodes may be provided by the number of phases (or an integer multiple thereof), which reduces variations and achieves a uniform photocurrent output.

It should be noted that in the planar structure illustrated in FIG. 1 or 5, the region between adjacent photodiodes (e.g., photodiodes 1a and 1b) is also shielded by the light shielding layer 22. This achieves an effect that "crosstalk" between the adjacent photodiodes can be reduced. For example, in FIG. 1 or 5, when the region between the photodiodes 1a and 1b is irradiated, mutual interference of extra photocurrents due to optical carriers generated in the semiconductor layer may occur between these photodiodes. In this respect, in the structure illustrated in FIGS. 1 and 5, the effect of mutual interference between the photodiodes can be reduced by shielding the region between these photodiodes with the light shielding layer 22. As a result, the spatial detection resolution can be increased. Since more precise photocurrent can be extracted from this encoder, output characteristics relevant to encoder functions (duty cycle, phase difference, etc.) can be obtained with more precision.

However, as long as the required resolution is obtained, the light shielding layer 22 may not be provided in the region between the photodiodes. That is, in the planar structure illustrated in FIG. 1 or 5, a configuration of the light shielding layer 22 only provided on each of the photodiodes 1a to 1d is also encompassed within the scope of the invention. This is also the case in the structure shown in FIGS. 6, 29, and 30 described later in detail.

Figure 6:
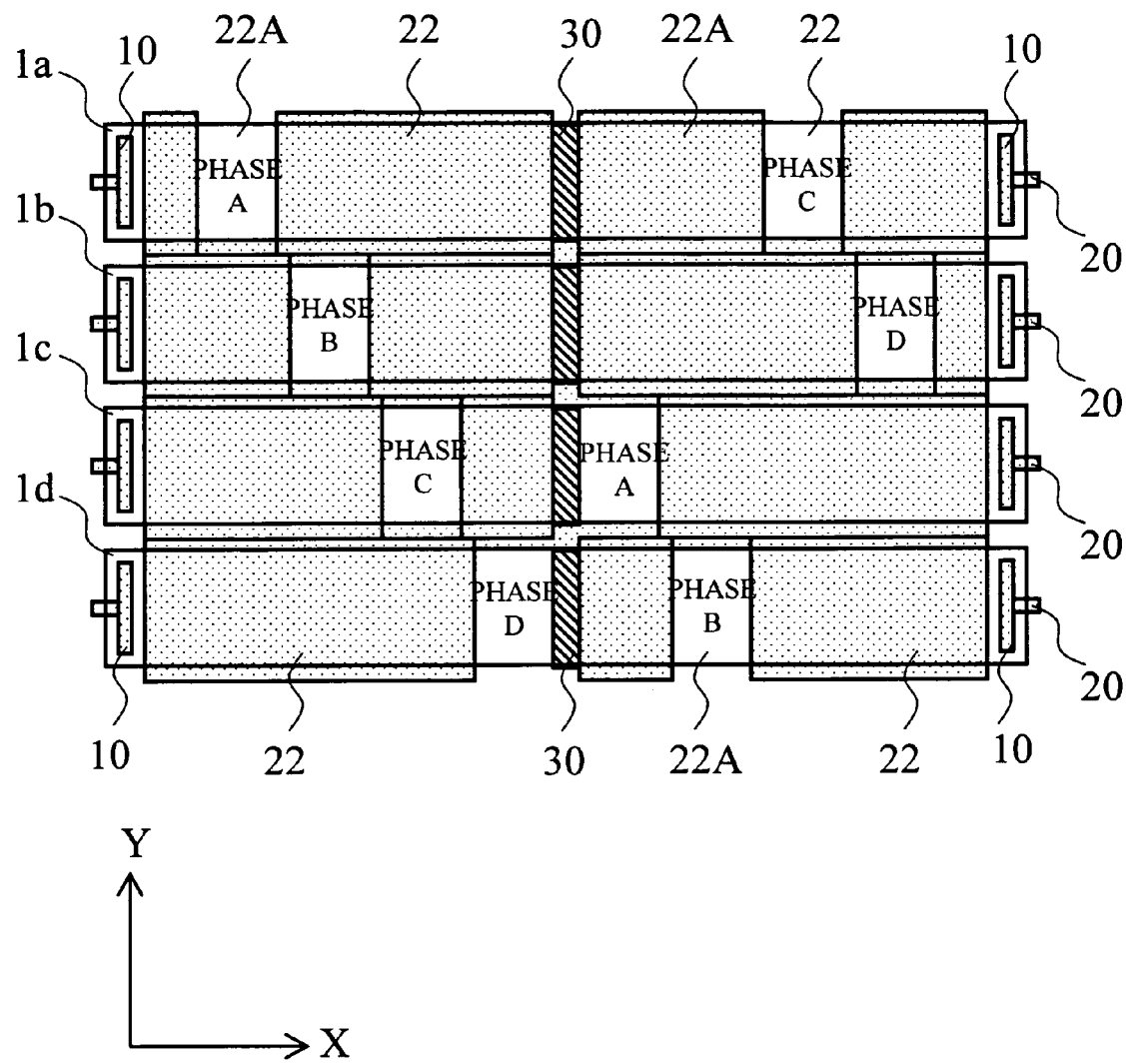
FIG. 6 is a plan perspective view illustrating the configuration of a light receiving device of an optical encoder according to another specific example of the first embodiment of the invention.

FIG. 6 is a plan perspective view showing a second specific example of the light receiving device that can be used in this embodiment.

Figure 7:
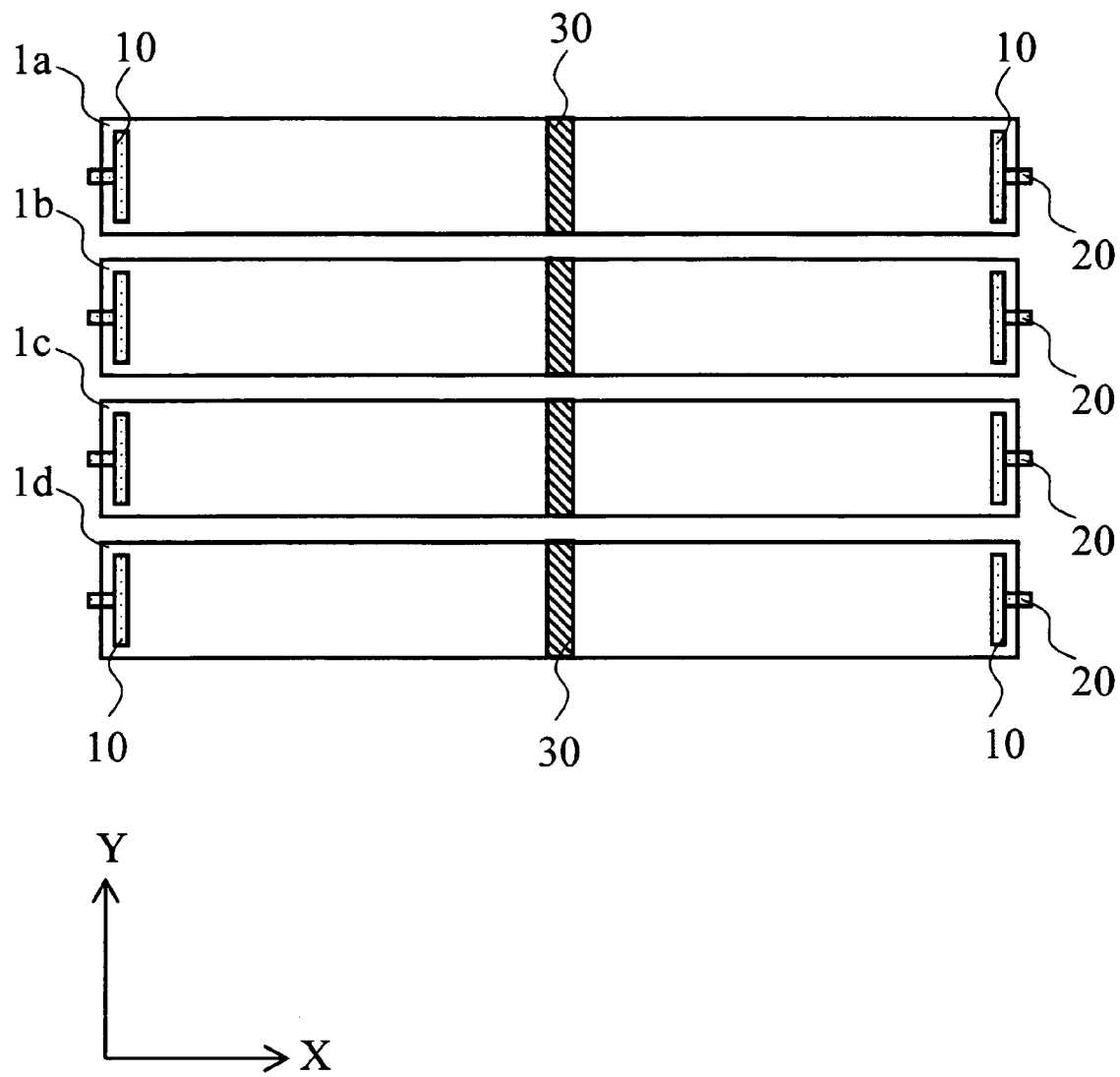
FIG. 7 is a plan view illustrating a light receiving device of the specific example of the invention from which light shielding layers are removed.

FIG. 7 is a plan view illustrating a light receiving device of this specific example from which light shielding layers are removed.

With respect to these figures, elements similar to those described with reference to FIGS. 1 to 5 are marked with the same numerals and are not described in detail.

In this specific example again, first photodiodes 1a to 1d extending in the x-direction (horizontal direction in FIG. 6) in a generally striped configuration are juxtaposed generally in parallel. However, in this specific example, the first photodiodes 1a to 1d are horizontally divided into two portions by an insulating region 30 provided in the middle of them. The insulating region 30 may be realized as an embedded insulator or high-resistance layer, or as a trench formed by etching away the surface semiconductor layer.

In this specific example, the phase of the openings 22A on the left side of the insulating region 30 is different from that on the right side. For example, for the first photodiode 1a, an opening 22A corresponding to "phase A" is provided on the left side of the insulating region 30, whereas an opening 22A corresponding to "phase C" is provided on the right side. Irradiation with the light/dark pattern through the scale 33 as described above with reference to FIGS. 3 and 4 causes simultaneous generation of photocurrent for "phase A" in the portion of the left opening 22A for the first photodiode 1a and in the portion of the right opening 22A for the first photodiode 1c. That is, optical signals are simultaneously generated in vertically (along the y-direction) different photodiodes in FIG. 6. Specifically, the left portion of the photodiode 1a and the right portion of the photodiode 1c are used for detecting "phase A", the left portion of the photodiode 1b and the right portion of the photodiode 1d are used for detecting "phase B", the left portion of the photodiode 1c and the right portion of the photodiode 1a are used for detecting "phase C", and the left portion of the photodiode 1d and the right portion of the photodiode 1b are used for detecting "phase D".

In this way, a more uniform photocurrent signal is obtained even when optical illumination has any unevenness along the y-direction. More specifically, as illustrated in FIG. 1, under the phase assignment of "phase A" to the photodiode 1a, "phase B" to the photodiode 1b, and so on, photocurrent outputs may differ between the phases when optical illumination is nonuniform along the y-direction.

In contrast, according to this specific example, photocurrent outputs in which any unevenness along the y-direction is averaged are obtained by light receiving units corresponding to "phase A", "phase B", and so on distributed along the y-direction. For example, suppose that the photodiode 1a has large optical illumination and the photodiode 1c has small optical illumination. Even in this case, according to this specific example, the photocurrent signal for "phase A" can be detected in these photodiodes 1a and 1c and averaged.

It should be noted that while FIGS. 6 and 7 show a specific example in which an insulating region 30 is provided in the center area of the first photodiodes, the invention is not limited thereto. More specifically, a plurality of insulating regions 30 may be provided for each of the first photodiodes 1a to 1d extending in the x-direction to divide each photodiode into three or more portions. With respect to the number of photodiodes, the invention is not limited to four photodiodes 1a to 1d provided in a striped configuration. More than four photodiodes may be juxtaposed. For example, any unevenness of light along the x-direction as well as the y-direction can be averaged using the configuration described later with reference to FIGS. 21 and 22.

Next, as a second embodiment of the invention, a light receiving device that cancels the DC component contained in the optical signal output of photodiodes and an optical encoder using the same will be described.

Figure 8:
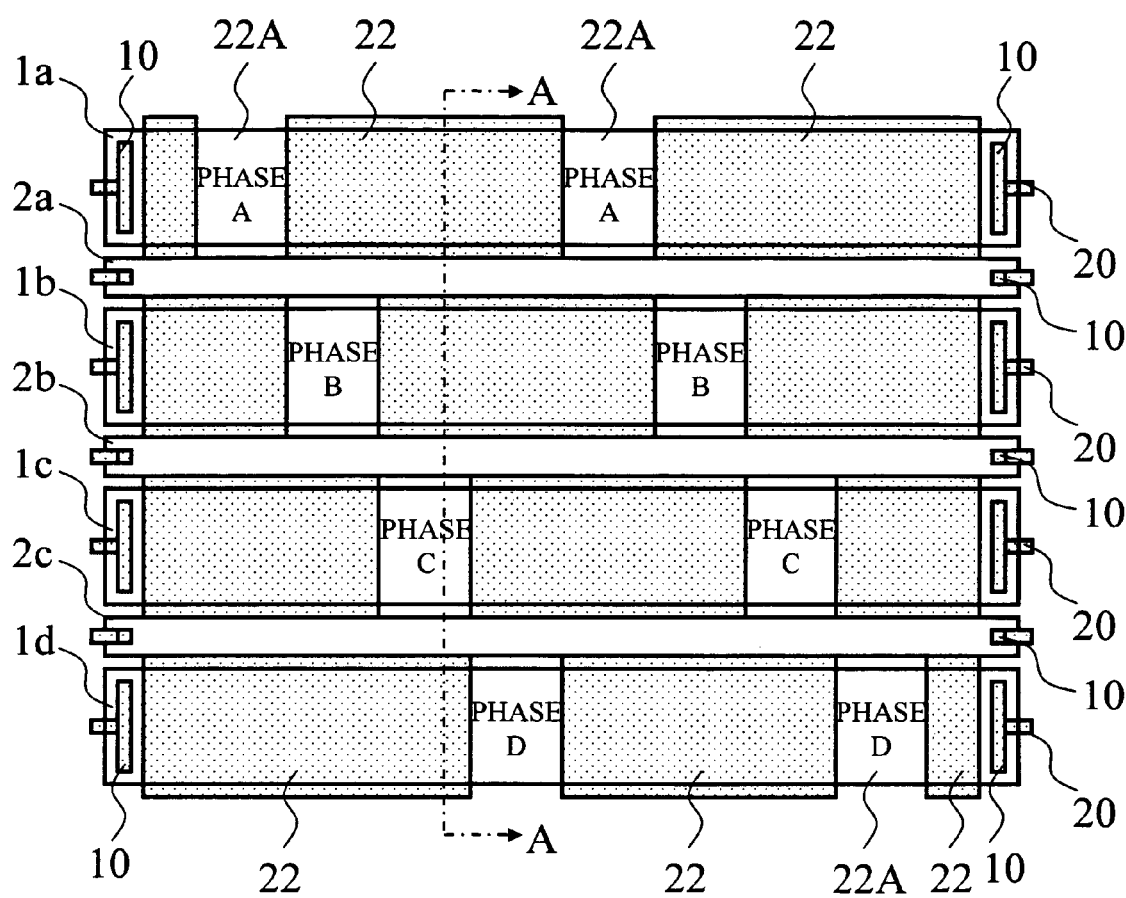
FIG. 8 is a plan perspective view illustrating the configuration of a light receiving device of an optical encoder according to a second embodiment of the invention.

FIG. 8 is a plan perspective view illustrating a configuration of a light receiving device of an optical encoder according to the second embodiment of the invention.

Figure 9:
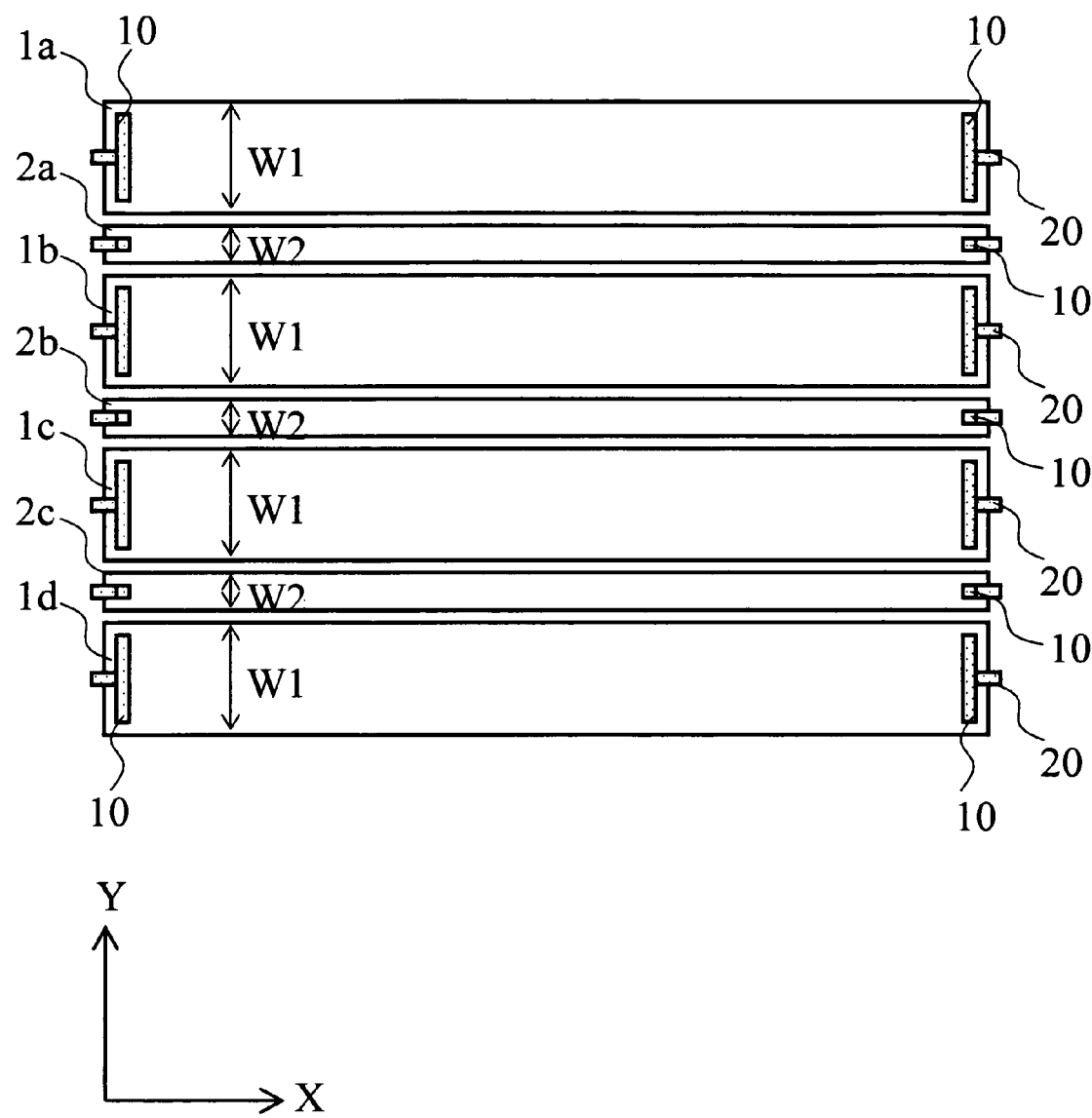
FIG. 9 is a plan view illustrating a light receiving device of a specific example of the invention from which light shielding layers are removed.

FIG. 9 is a plan view illustrating a light receiving device of this specific example from which light shielding layers are removed.

More specifically, the light receiving device of this specific example comprises first photodiodes 1a to 1d and second photodiodes 2a to 2c in a generally striped configuration extending in a first direction (x-direction) The first and second photodiodes 1a to 2c are alternately juxtaposed generally in parallel. The width W1 of the first photodiodes 1a to 1d is greater than the width W2 of the second photodiodes 2a to 2c. However, the invention is not limited thereto. The width W1 may be equal to W2, or W2 may be greater.

Figure 10:
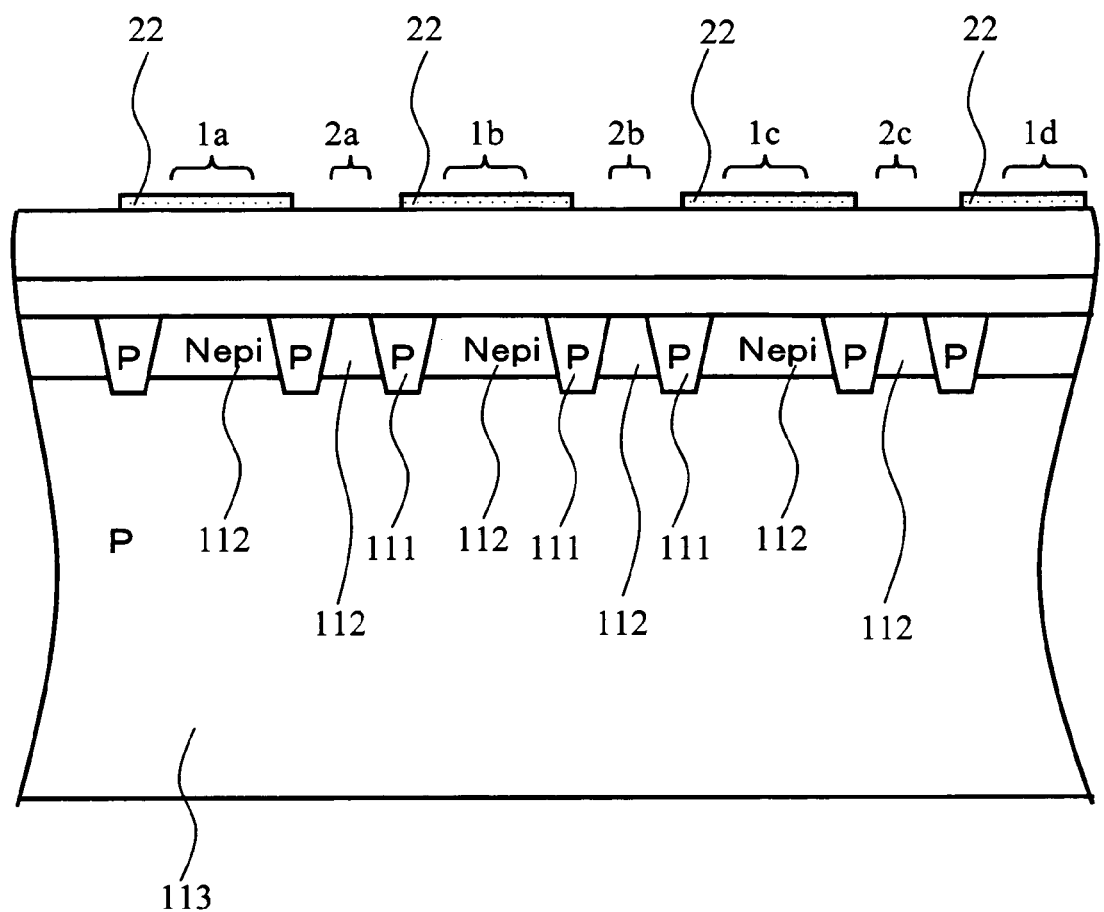
FIG. 10 is a schematic view showing an example of the cross-sectional structure of photodiodes of the embodiment of the invention.

FIG. 10 is a schematic view showing an example of the cross-sectional structure of photodiodes of this embodiment. That is, this figure is a cross section along line A—A of FIG. 8.

In this specific example, an n-type epitaxial layer 112 is provided on a p-type silicon substrate 113 to form p-n junction photodiodes (1a, 2a, . . . ). These photodiodes are separated from each other by p-type separating regions 111.

Figure 11:
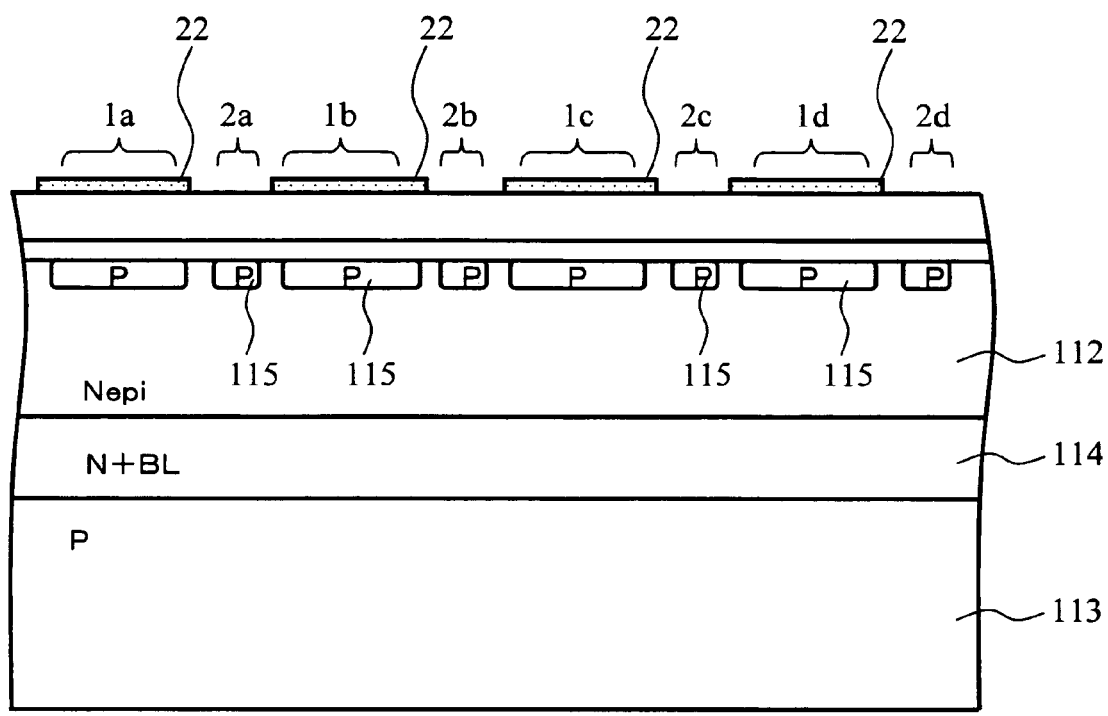
FIG. 11 is a schematic view showing another example of the cross-sectional structure of photodiodes of the embodiment of the invention.

FIG. 11 is a schematic view showing another example of the cross-sectional structure of photodiodes of this embodiment. That is, this figure is also a cross section along line A—A of FIG. 8.

In this structure, an $n^+$-type buried layer 114 is provided on a p-type silicon substrate 113, and an n-type epitaxial layer 112 is formed on the $n^+$-type buried layer 114. P-type diffusion regions 115 are formed in the surface of the n-type epitaxial layer 112 in a planar configuration. Each photodiode (1a, 2a, . . . ) is configured by a p-n junction formed by the diffusion region 115.

Returning to FIG. 8, a metal wiring 20 is connected to both ends of the photodiodes 1a to 2c via a contact 10.

As shown in FIG. 8, light shielding layers 22 are provided on the first photodiodes 1a to 1d. The light shielding layer 22 can be formed, for example, from the same metal layer as the metal wiring 20. In this respect, it is advantageous to connect the light shielding layers 22 to ground potential because a shielding effect is also achieved. The light shielding layer 22 has openings 22A formed at a predetermined pitch. In the specific example shown in FIG. 8, the spacing between the openings 22A provided for the first photodiode 1a is matched with the pitch of the light/dark pattern of the scale described later in detail. Similarly, the first photodiodes 1b, 1c, and 1d are provided with openings 22A at the same pitch with respective different phases. In this specific example, the pitch formed for the openings 22A has four phases, that is, phases A to D.

On the other hand, the second photodiodes 2a–2c are not provided with a light shielding layer 22.

The DC component can be canceled by using the first photodiodes 1a to 1d for signal detection and using the second photodiodes 2a to 2c for DC component compensation. That is, according to this embodiment, an optical encoder equipped with a light receiving device having such a unique structure can cancel the DC component to achieve high sensitivity and wide dynamic range. This point will be described with reference to the configuration of the encoder.

Figure 12:
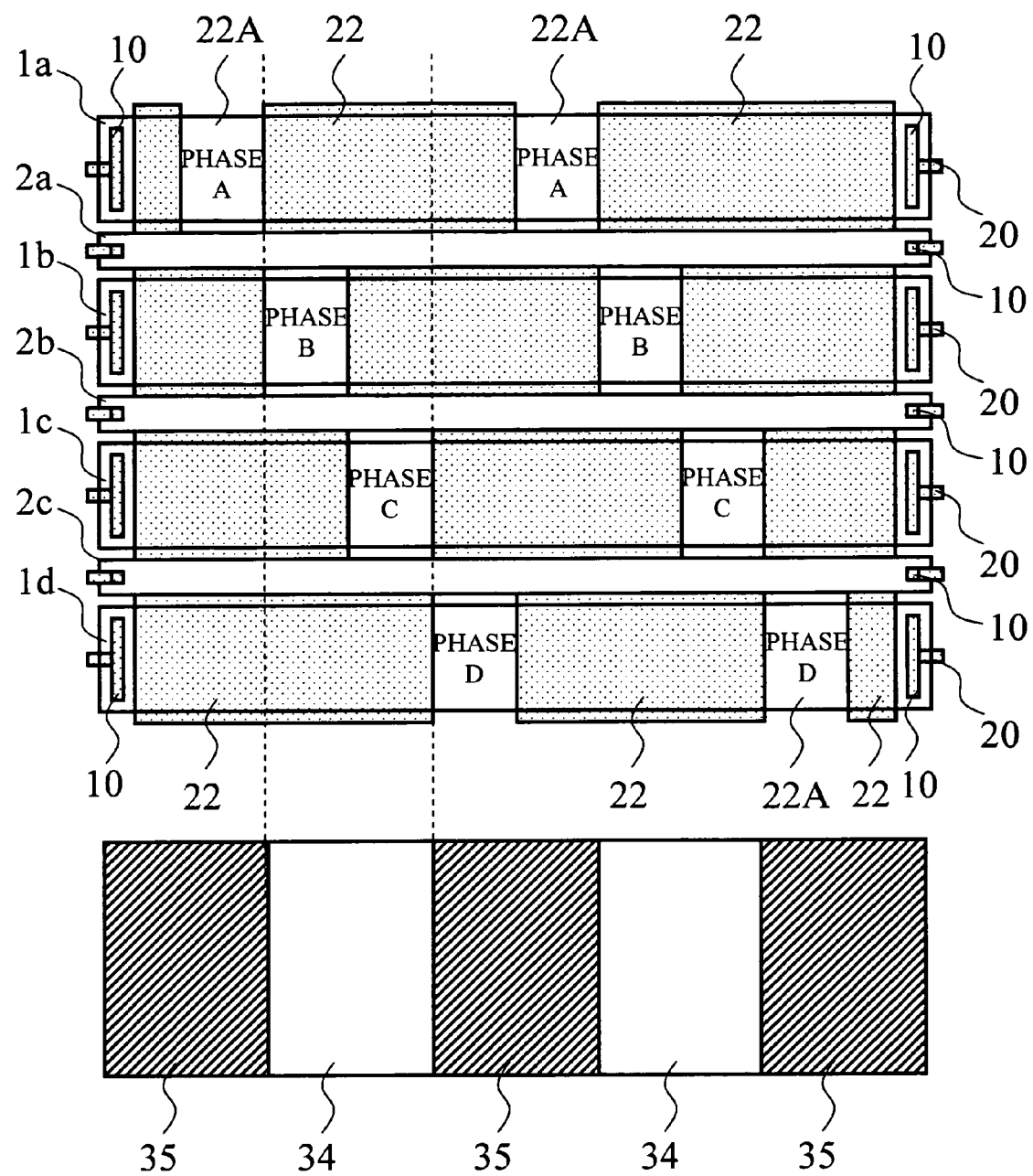
FIG. 12 is a schematic view illustrating the relationship between the opening 22A of the light receiving device and the pitch of the scale 33 of the embodiment of the invention.

FIG. 12 is a schematic view illustrating the relationship between the opening 22A of the light receiving device and the pitch of the scale 33 of the encoder of this embodiment. More specifically, with regard to each of the photodiodes 1a to 1d, the pitch of the openings 22A is matched with the light/dark pattern of the scale 33. A relative displacement between the light receiving device and the scale 33 changes photocurrent signals obtained from the photodiodes 1a to 1d, respectively. The amount of displacement can be determined by examining this change. Furthermore, in this embodiment, the amount of optical illumination for the second photodiodes 2a to 2c does not change and a constant amount of photocurrent signal is always obtained even under any displacement of the scale 33. This photocurrent signal can be used to cancel the DC (direct current) component contained in the photocurrent signals obtained from the first photodiodes 1a to 1d. This results in high sensitivity and wide dynamic range.

This point will be described with reference to a comparative example.

Figure 13:
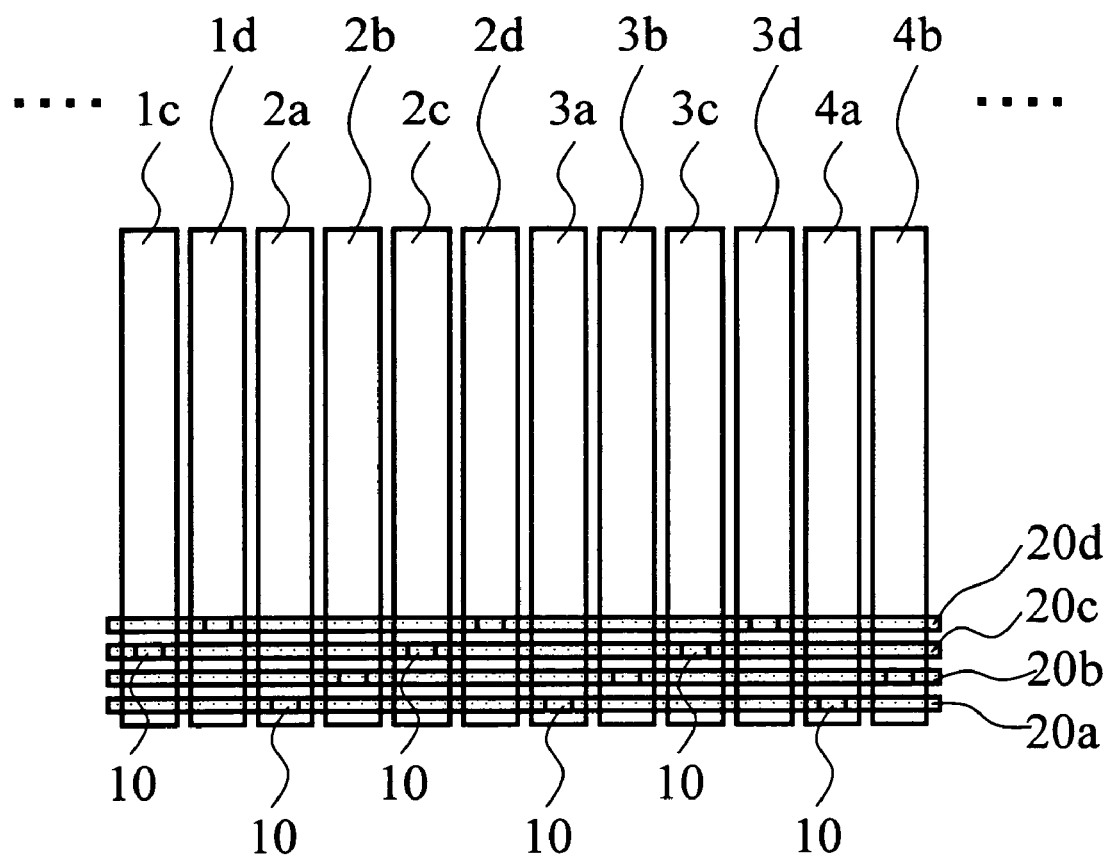
FIG. 13 is a schematic view illustrating a planar pattern of a light receiving device in an optical encoder of a comparative example investigated by the inventor in the process of reaching the invention.

FIG. 13 is a schematic view illustrating a planar pattern of a light receiving device in an optical encoder of a comparative example investigated by the inventor in the process of reaching the invention.

In this comparative example, photodiodes (1c, 1d, . . . ) each extend vertically (y-direction) in a generally rectangular configuration and are arrayed horizontally (x-direction). The photodiodes are connected to four-phase wirings (20a to 20d) in turn via contacts 10. That is, four adjacent photodiodes (1a to 1d, 2a to 2d, 3a to 3d, 4a to 4d) are treated as a group in making connection.

Figure 14:
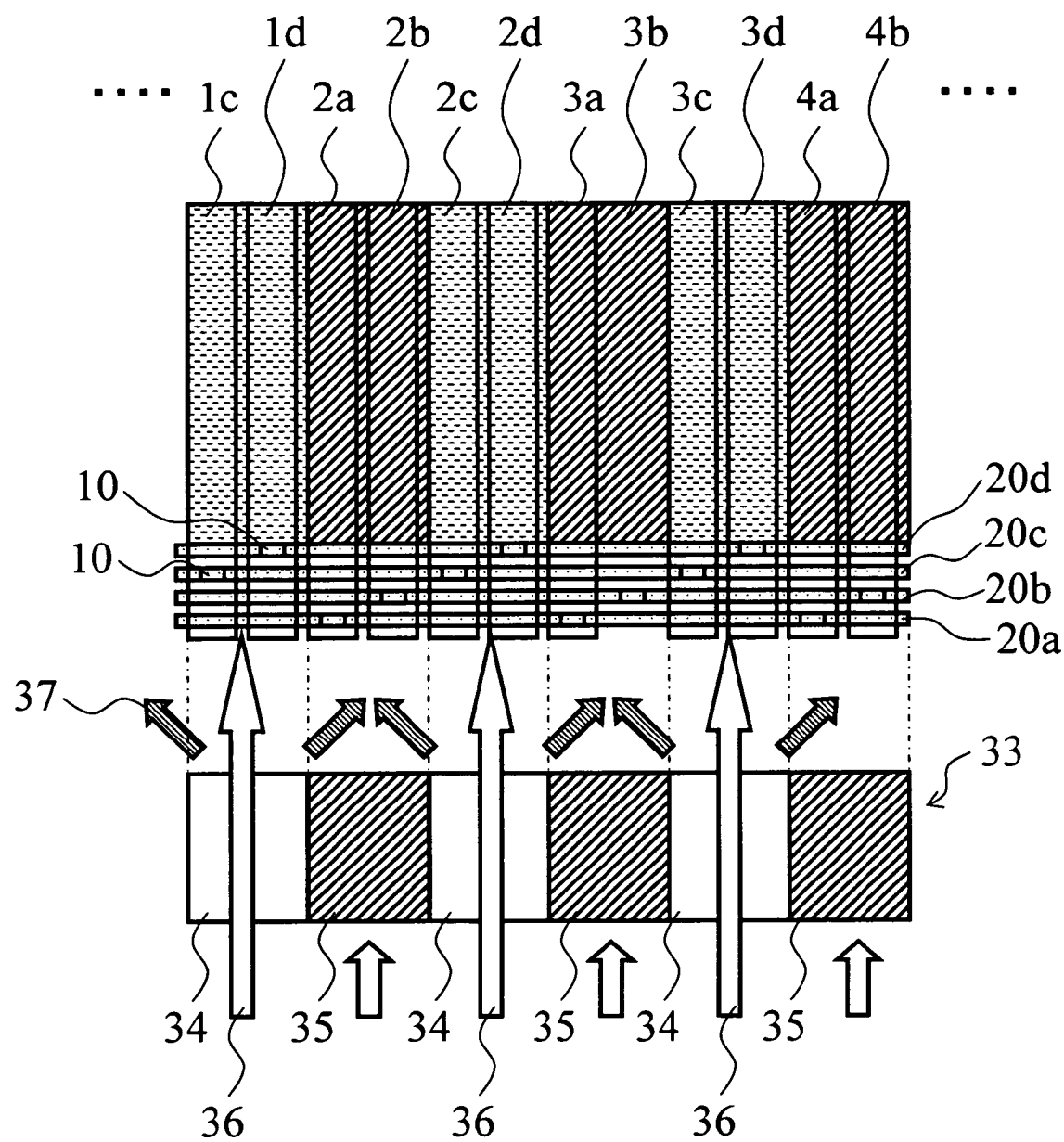
FIG. 14 is a schematic view showing the positional relationship between the scale 33 and the light receiving device in the comparative example.

FIG. 14 is a schematic view showing the positional relationship between the scale 33 and the light receiving device in this comparative example.

More specifically, the pitch of the transmitting pattern 34 and the light shielding pattern 35 of the scale 33 is generally matched with the pitch of the array of photodiodes (1c, 1d, . . . ). For example, in the comparative example shown in this figure, a pair of light/dark patterns 34, 35 of the scale 33 is matched with a group of photodiodes (1a to 1d, 2a to 2d).

Light from the light emitting unit 31 is transmitted through the scale 33, and then given a light/dark contrast by the light/dark patterns 34, 35 of the scale before entering the light receiving unit 32. The light/dark contrast of this light causes difference in photocurrent flows for the respective phases of photodiodes. This difference in photocurrent is detected and outputted by the circuit.

Figure 15:
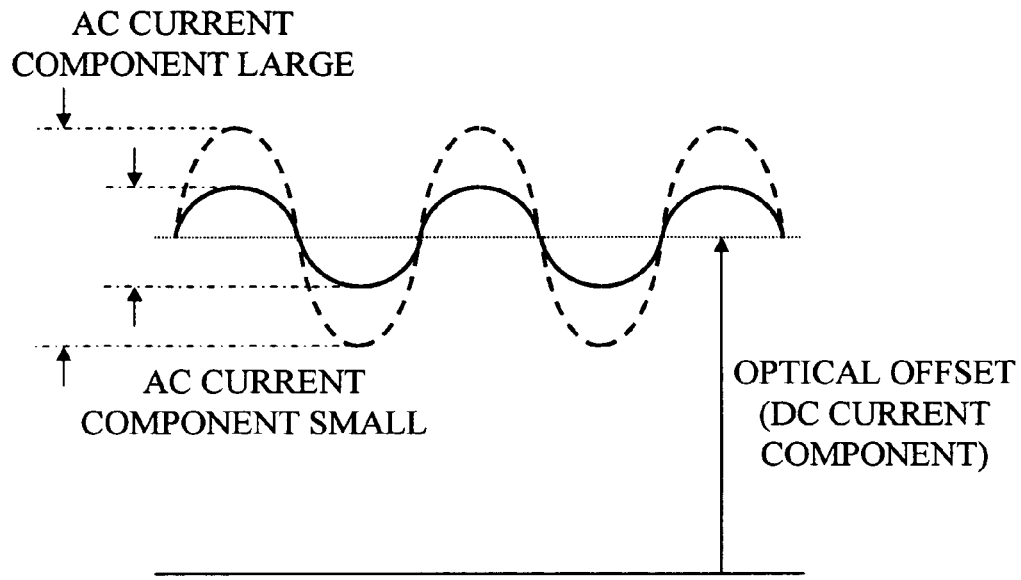
FIG. 15 is a graphical diagram illustrating an optical signal waveform obtained when the light receiving device of the comparative example is used.

FIG. 15 is a graphical diagram illustrating an optical signal waveform obtained when the light receiving device of this comparative example is used.

When the light receiving device of this comparative example is used, a relative displacement between the scale 33 and the light receiving device causes photocurrent having a waveform as shown in FIG. 15 to be obtained in each of the four-phase wirings (20a to 20d) connected to the photodiodes. The direction and amount of relative displacement between the scale 33 and the encoder can be determined by sensing the temporal change of waveforms obtained from the respective four-phase wirings (20a to 20d).

However, the waveform of photocurrent obtained from the light receiving device of this comparative example is a combination of DC and AC current components. The problem here is that the photocurrent has a DC current component. As shown in FIG. 14, the scale 33 gives a light/dark contrast to light incident on the light receiving device. Rectilinear light 36 is transmitted through the transmitting pattern 34 of the scale 33. However, refraction or diffraction, or influence from ambient light may cause some extra light 37 to enter those photodiodes under the light shielding pattern 35 that are basically preferred not to receive any light, thereby producing the DC component. Crosstalks by light or optical carriers between adjacent photodiodes may also generate the DC component.

The generated DC current component may cause a problem that the AC current component is collapsed in the current-voltage converting circuit to produce a distorted output waveform, which results in degradation of output characteristics (duty cycle and phase difference) of the circuit. To expand the dynamic range against this problem, the supply voltage must be increased so that the AC component may not be collapsed even for a high optical input. This is a disadvantage to the reduction of supply voltage of the circuit.

Furthermore, it is observed that the DC component tends to be pronounced when the encoder is downsized. This is because the spacing between the light emitting unit 31 and the light receiving unit 32 is decreased with the downsizing, which degrades parallelism of light emitted from the light emitting unit 31 and incident on the light receiving unit 32. Therefore, improvement is also required for downsizing the optical encoder.

In this respect, the light receiving device of this embodiment can be used to significantly reduce the DC component in photocurrent.

Figure 16:
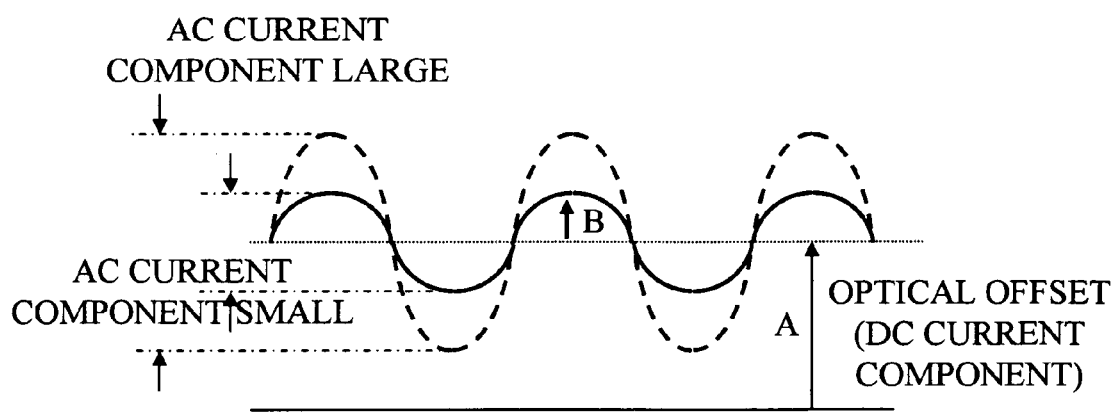
FIG. 16 is a schematic view for illustrating a DC component cancellation effect achieved by the invention.

FIG. 16 is a schematic view for illustrating a DC component cancellation effect achieved in this embodiment.

The optical signal obtained from the encoder has DC and AC components as described above. The AC component may have a relatively large amplitude as illustrated by a broken line in this figure, or may have a relatively small amplitude as illustrated by a solid line in this figure, depending on factors such as the positional relationship between the light emitting unit and the light receiving unit. Here, the amplitude in the case of the small amplitude (solid line) is denoted by B, and the level of the DC component is denoted by A. When no DC cancellation is applied, as shown in FIG. 15 described above, the ratio of A to B is on the order of, for example, A:B=5:1.

In contrast, according to this embodiment, the photocurrent of the second photodiodes 2a to 2c can be used to cancel the DC component. As a result, as shown in FIG. 16, the level of the DC component can be reduced to A:B=2:1 or less.

Current I2 for this cancellation is set to a current value lower than the photocurrent I1. The ratio of the total area of the openings 22A provided for the first photodiodes 1a to 1d versus the area of the second photodiodes 2a to 2c may be used to estimate the respective values of photocurrent (DC current component), and to set a current ratio for the current mirror circuit described later under the condition I2<I1.

According to this embodiment, the reduction of the DC component in the photocurrent leads to the following effects.

First, the dynamic range of signals can be expanded. More specifically, variation of photocurrent can be kept small by canceling (subtracting) the DC current component of the photocurrent of the signal photodiodes even when the optical intensity of the light emitting unit is varied. As a result, the input dynamic range of the circuit can be expanded.

In addition, the supply voltage of the circuit can be decreased. More specifically, a high supply voltage is conventionally required to expand the dynamic range of the current-voltage converting circuit. In contrast, according to this embodiment, the dynamic range can be expanded because the variation of photocurrent due to the variation of optical intensity of the light emitting unit is suppressed. Therefore, high supply voltage is not required, and the supply voltage of the circuit can be decreased.

Furthermore, the precision of output characteristics (duty cycle and phase difference) of the encoder can be enhanced. More specifically, photocurrent having an AC component of large amplitude can be extracted by reducing the DC component. Therefore, output characteristics relevant to encoder functions (duty cycle and phase difference) can be obtained with more precision.

Moreover, the encoder can be easily downsized. More specifically, a downsized optical encoder has a small spacing between its light emitting unit and light receiving unit, which degrades parallelism of light incident on the light receiving unit. For this reason, the light/dark pattern of the scale is not faithfully realized on the light receiving unit, which tends to increase the DC component due to diffraction of light. In contrast, according to this embodiment, since the DC component can be reduced definitely and easily, the optical encoder can be downsized to ensure high resolution.

Moreover, the resolution of the encoder is determined by the pitch of the openings 22A provided in the light shielding layer 22. Advantageously, there is no need for finely partitioning the diffusion and epitaxial region. That is, the light shielding layer 22 can be formed from the same metal layer as the metal wiring 20. The opening 22A can be formed on the basis of a fine design rule (minimum dimension) similar to that of the metal wiring. Therefore, the resolution of the encoder can also be highly enhanced.

In addition, it is advantageous to form the light shielding layer 22 from the same metal layer as the metal wiring and connect it to ground potential because a shielding effect for the photodiodes 1a to 1d is also achieved.

Moreover, the second photodiodes 2a to 2c are interposed between the first photodiodes 1a to 1d. This achieves an effect that noise due to crosstalk between the adjacent first photodiodes 1a to 1d can be reduced. For example, crosstalk due to photocurrent leak between the first photodiodes 1a and 1b can be suppressed by providing a second photodiode 2a between the first photodiodes 1a and 1b, and thereby the noise level of optical signals can be reduced.

Figure 17:
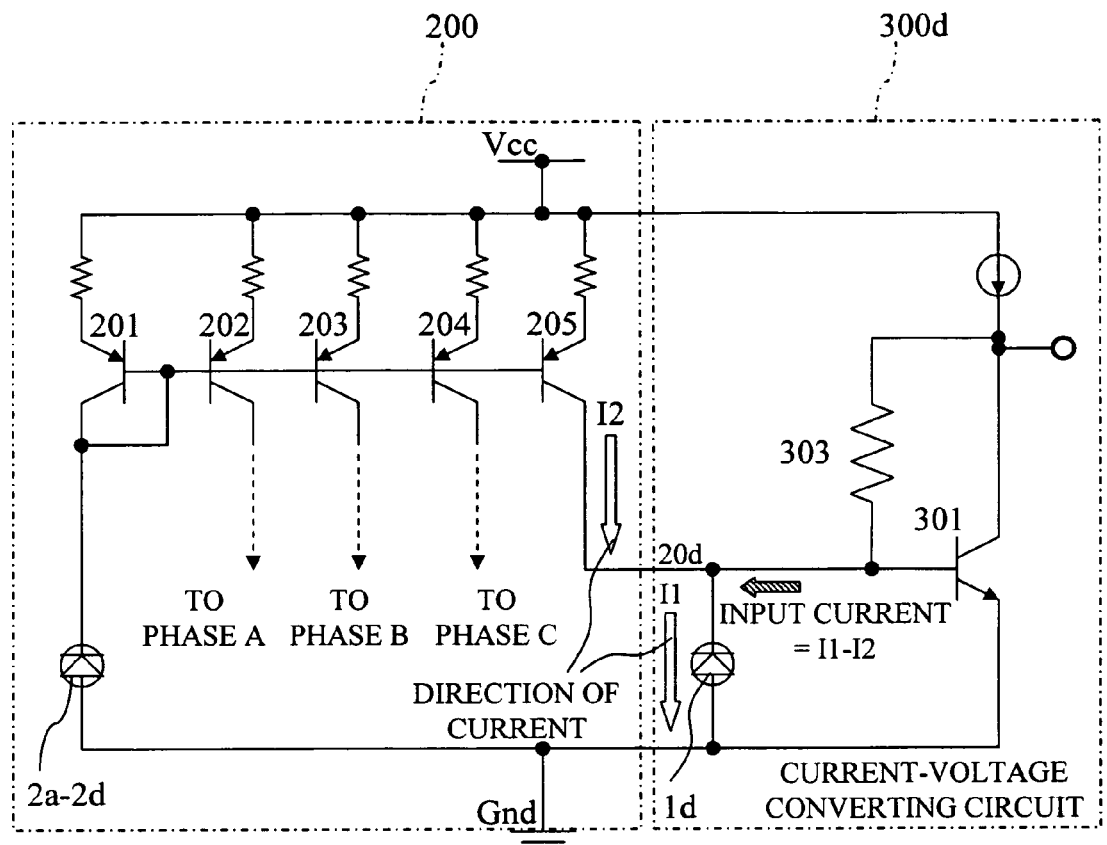
FIG. 17 is a schematic view showing a circuit that can be used in an optical encoder of the embodiment of the invention.

FIG. 17 is a schematic view showing a circuit that can be used in an optical encoder of this embodiment.

This figure illustrates a circuit that can be provided in a semiconductor device having a cross-sectional structure as shown in FIG. 10. More specifically, the circuit can be provided around photodiodes implemented by forming an n-type epitaxial layer 112 on a p-type silicon substrate.

The circuit comprises current-voltage converting units 300a to 300d and a DC canceling unit 200.

The first photodiodes (1a to 1d) are connected to the current-voltage converting units 300a to 300d, respectively. FIG. 17 shows the configuration of one of the current-voltage converting units, 300d. More specifically, in the current-voltage converting unit 300d, a converting transistor 301 and a resistor 303 convert photocurrent flowing through the first photodiode 1d into voltage for output. Although not shown, the other current-voltage converting units 300a to 300c have a similar structure.

On the other hand, the second photodiodes 2a to 2d are connected to the DC canceling unit 200. Here, more than one of the second photodiodes 2a to 2d may be connected in parallel, or only one of the second photodiodes 2a to 2d may be connected. The anodes of the second photodiodes are connected to ground (Gnd). The cathodes are connected to the base and collector of a reference PNP transistor 201 of a current mirror circuit. PNP transistors (202 to 205) are connected to mirror the current from the reference PNP transistor 201. The collectors of the PNP transistors (202 to 205) are connected to the current-voltage converting unit 300d via a wiring 20d, which leads to the cathodes of the first photodiodes 1d to nd.

Although not shown, similarly, the collectors of the PNP transistors 202, 203, and 204 are connected to the cathodes of the first photodiodes 1a, 1b, and 1c in the current-voltage converting units 300a, 300b, and 300c, respectively.

According to this circuit configuration, the input current to the current-voltage converting circuit 300d is (I1–I2 ). That is, current corresponding to I2 can be canceled (subtracted). In other words, current I2 is produced on the basis of photocurrent flowing through the second photodiode 2a (to 2d), which can be used to compensate for the DC component of the signals obtained from the first photodiodes.

If the current mirror ratio can be set arbitrarily, the current I2 required for canceling the DC current component can be set to an optimal amount (current value) of DC cancellation. As a result, the level of the DC component in the output signal obtained from the current-voltage converting unit 300 can be decreased to nearly zero. If the output voltage of the current-voltage converting circuit has a wide dynamic range, settings that do not satisfy I2<I1 are also possible.

Figure 18:
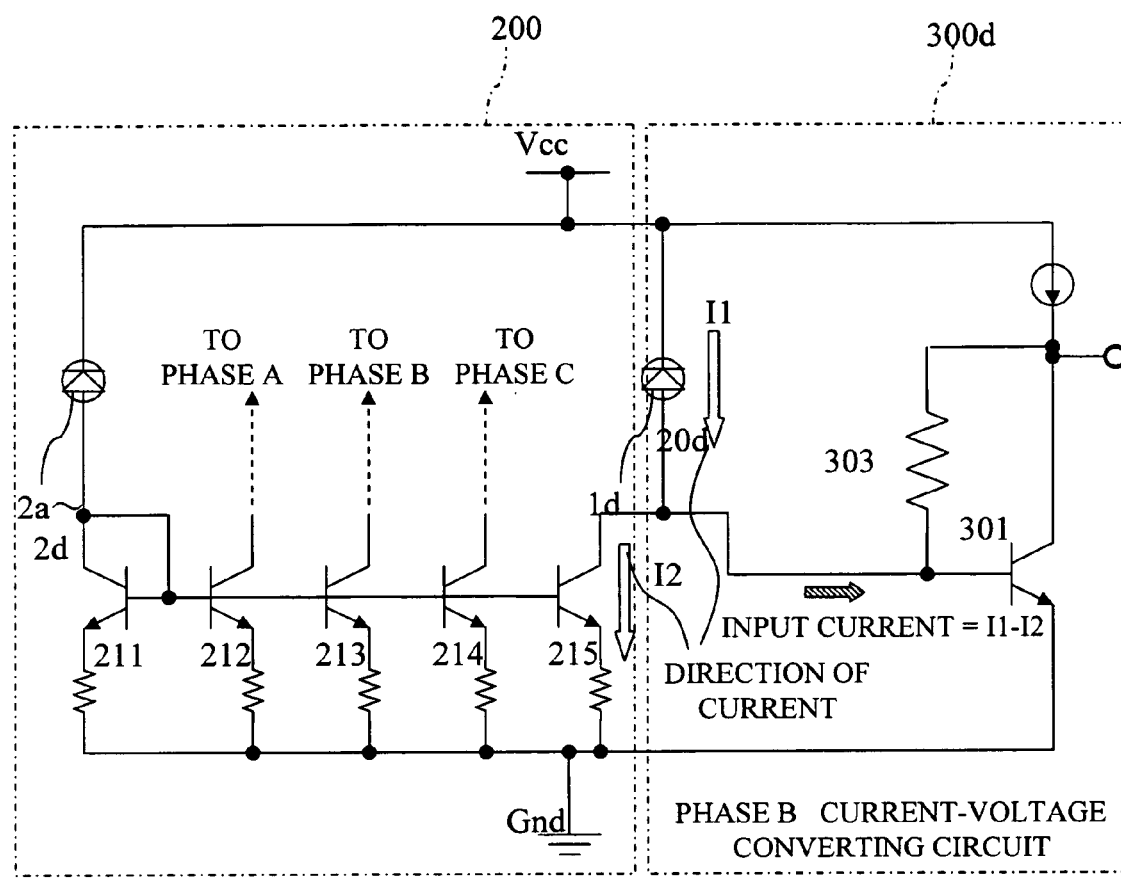
FIG. 18 is a schematic view showing another example of the circuit that can be used in the invention.

FIG. 18 is a schematic view showing another specific example of the circuit that can be used in the invention. More specifically, this figure illustrates a circuit that can be provided around photodiodes implemented by forming a p-type diffusion layer in the surface of an n-type epitaxial layer as shown in FIG. 11.

The circuit of this specific example also comprises current-voltage converting units 300a to 300d and a DC canceling unit 200. The cathodes of the second photodiodes 2a to 2d are connected to Vcc. The anodes are connected to the base and collector of a reference NPN transistor 211 of a current mirror circuit. Here again, more than one of the second photodiodes 2a to 2d may be commonly connected in parallel, or only one of them may be connected.

NPN transistors (212 to 215) are connected to mirror the current from the reference NPN transistor 211. The collector of the NPN transistor 215 is connected to the anode of the first photodiode 1d.

According to this circuit configuration, the input current to the current-voltage converting circuit 300d is (I1–I2 ). That is, current corresponding to I2 can be canceled (subtracted).

Next, other specific examples of the light receiving device that can be used in the optical encoder of this embodiment will be described.

Figure 19:
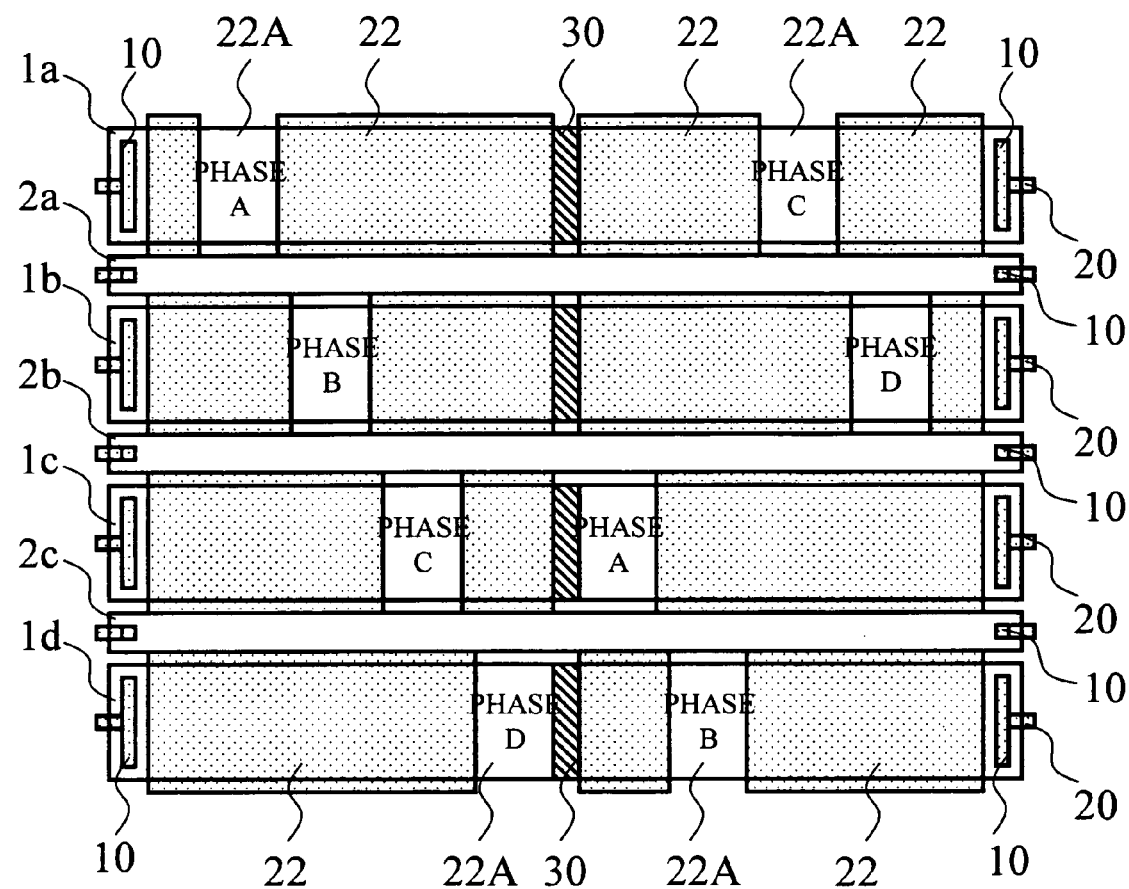
FIG. 19 is a plan perspective view showing a second specific example of the light receiving device that can be used in the embodiment of the invention.

FIG. 19 is a plan perspective view showing a second specific example of the light receiving device that can be used in this embodiment.

Figure 20:
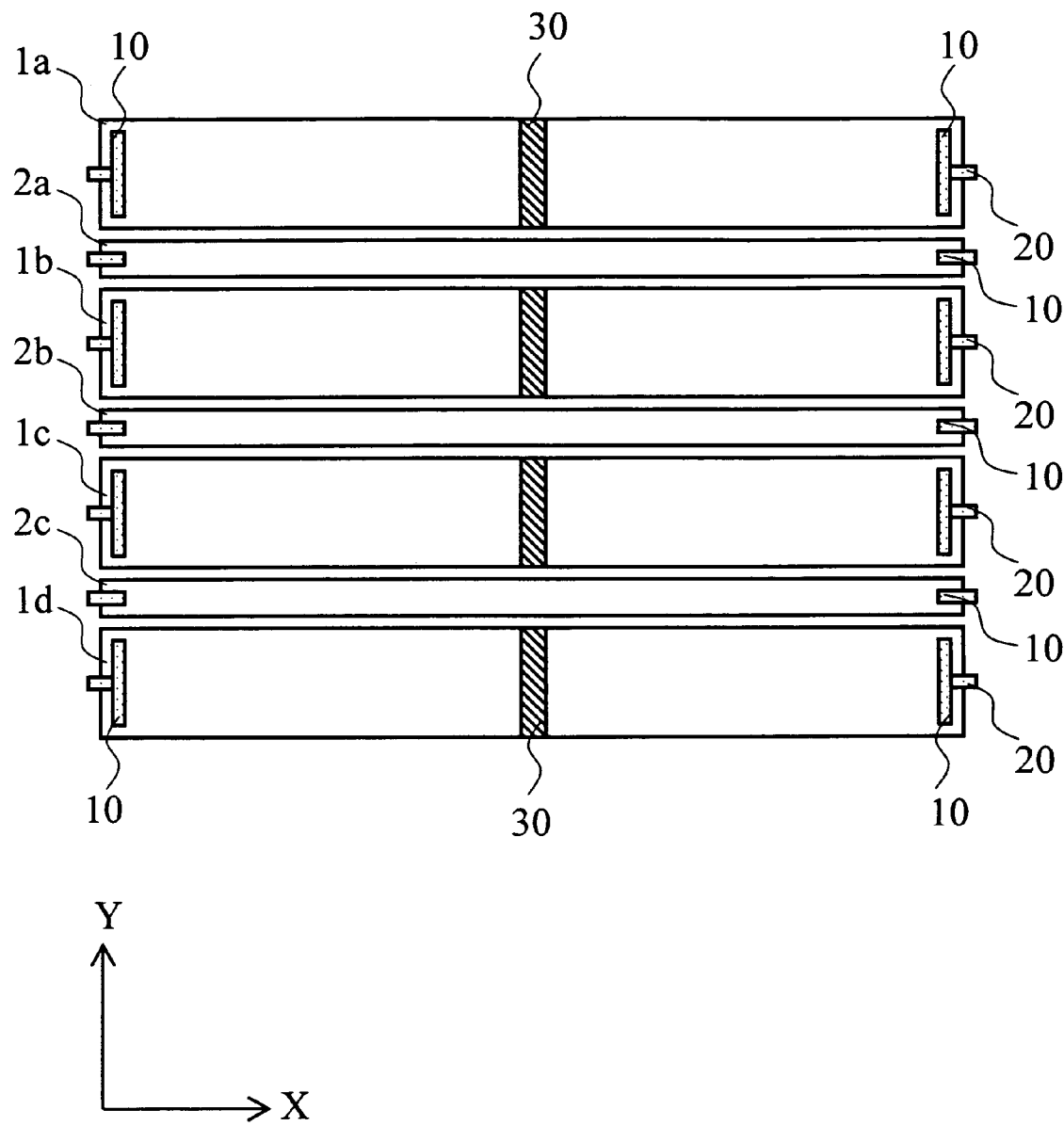
FIG. 20 is a plan view illustrating a light receiving device of the specific example of the invention from which light shielding layers are removed.

FIG. 20 is a plan view illustrating a light receiving device of this specific example from which light shielding layers are removed.

With respect to these figures, elements similar to those described with reference to FIGS. 1 to 18 are marked with the same numerals and are not described in detail.

In this specific example again, first photodiodes 1a to 1d and second photodiodes 2a to 2d extending in the x-direction (horizontal direction in FIG. 19) in a generally striped configuration are alternately juxtaposed generally in parallel. However, in this specific example, the first photodiodes 1a to 1d are horizontally divided into two portions by an insulating region 30 provided in the middle of them. The insulating region 30 may be realized as an embedded insulator or high-resistance layer, or as a trench formed by etching away the surface semiconductor layer.

In this specific example, the phase of the openings 22A on the left side of the insulating region 30 is different from that on the right side. For example, for the first photodiode 1a, an opening 22A corresponding to "phase A" is provided on the left side of the insulating region 30, whereas an opening 22A corresponding to "phase C" is provided on the right side. Irradiation with the light/dark pattern through the scale 33 as described above with reference to FIG. 12 causes simultaneous generation of photocurrent for "phase A" in the portion of the left opening 22A for the first photodiode 1a and in the portion of the right opening 22A for the first photodiode 1c. That is, optical signals are simultaneously generated in vertically (along the y-direction) different photodiodes in FIG. 19. Specifically, the left portion of the photodiode 1a and the right portion of the photodiode 1c are used for detecting "phase A", the left portion of the photodiode 1b and the right portion of the photodiode 1d are used for detecting "phase B", the left portion of the photodiode 1c and the right portion of the photodiode 1a are used for detecting "phase C", and the left portion of the photodiode 1d and the right portion of the photodiode 1b are used for detecting "phase D".

In this way, a uniform photocurrent signal is obtained even when optical illumination has any unevenness along the y-direction. More specifically, as illustrated in FIG. 1, under the phase assignment of "phase A" to the photodiode 1a, "phase B" to the photodiode 1b, and so on, photocurrent outputs may differ between the phases when optical illumination is nonuniform along the y-direction.

In contrast, according to this specific example, photocurrent outputs in which any unevenness along the y-direction is averaged are obtained by light receiving units corresponding to "phase A", "phase B", and so on distributed along the y-direction.

Furthermore, according to this embodiment, as described above with reference to FIGS. 1 to 18, outputs of the second photodiodes 2a to 2d can be used to cancel the DC component. As a result, a downsized optical encoder having high sensitivity, high dynamic range, and high resolution can be provided.

It should be noted that while FIGS. 19 and 20 show a specific example in which an insulating region 30 is provided in the center area of the first photodiodes, the invention is not limited thereto. More specifically, a plurality of insulating regions 30 may be provided for each of the first photodiodes 1a to 1d extending in the x-direction to divide each photodiode into three or more portions.

Figure 21:
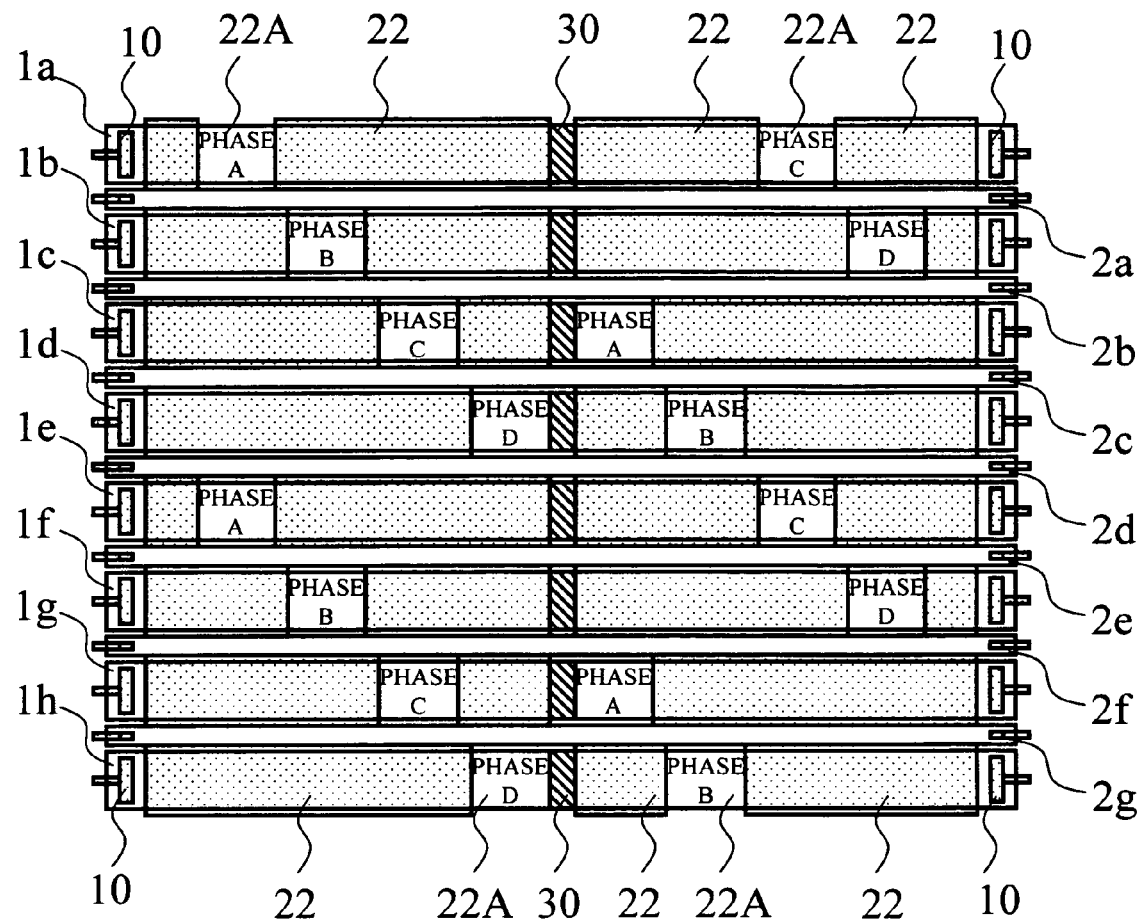
FIG. 21 is a plan perspective view showing a third specific example of the light receiving device that can be used in the embodiment of the invention.

FIG. 21 is a plan perspective view showing a third specific example of the light receiving device that can be used in this embodiment.

Figure 22:
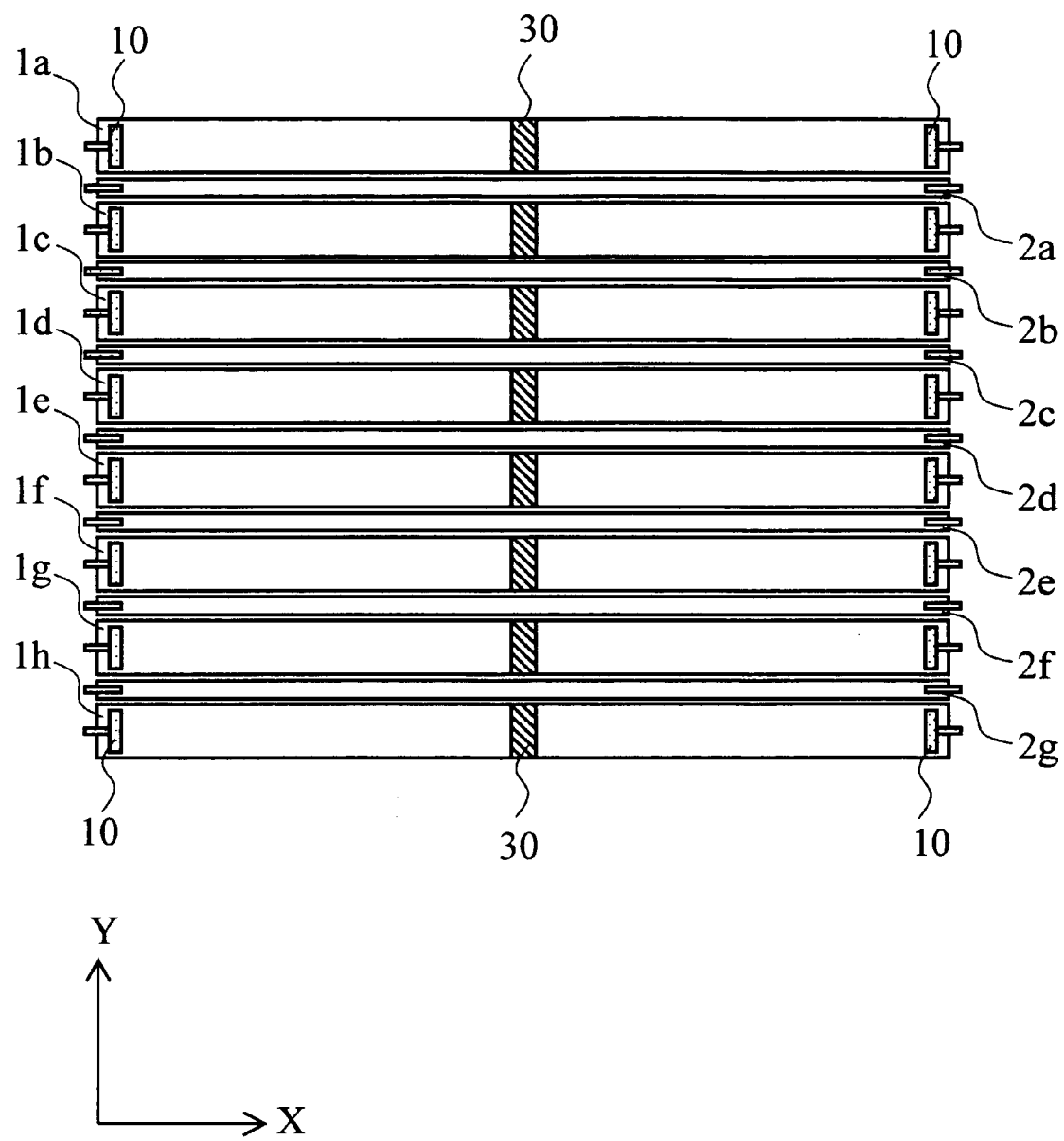
FIG. 22 is a plan view illustrating a light receiving device of a specific example of the invention from which light shielding layers are removed.

FIG. 22 is a plan view illustrating a light receiving device of this specific example from which light shielding layers are removed.

With respect to these figures again, elements similar to those described with reference to FIGS. 1 to 20 are marked with the same numerals and are not described in detail.

In this specific example, eight photodiodes 1a to 1h are provided as the first photodiodes in a striped configuration extending in the x-direction. Second photodiodes 2a to 2g are provided between these first photodiodes. As described above with reference to the second specific example, the first photodiodes 1a to 1h are horizontally divided into two portions by an insulating region 30 provided in the middle of them. As with the second specific example, the phase of the openings 22A on the left side of the insulating region 30 is different from that on the right side.

For example, "phase A" is detected by the left side of the photodiode 1a, the right side of the photodiode 1c, the left side of the photodiode 1e, and the right side of the photodiode 1g. In this way, the portions that simultaneously detect light are distributed along the y-direction as well as the x-direction. As a result, two-dimensional unevenness of light is averaged so that a more uniform photocurrent signal can be obtained.

Furthermore, according to this specific example, as described above with reference to FIGS. 1 to 18, outputs of the second photodiodes 2a to 2g can be used to cancel the DC component. As a result, a downsized optical encoder having high sensitivity, high dynamic range, and high resolution can be provided.

Figure 23:
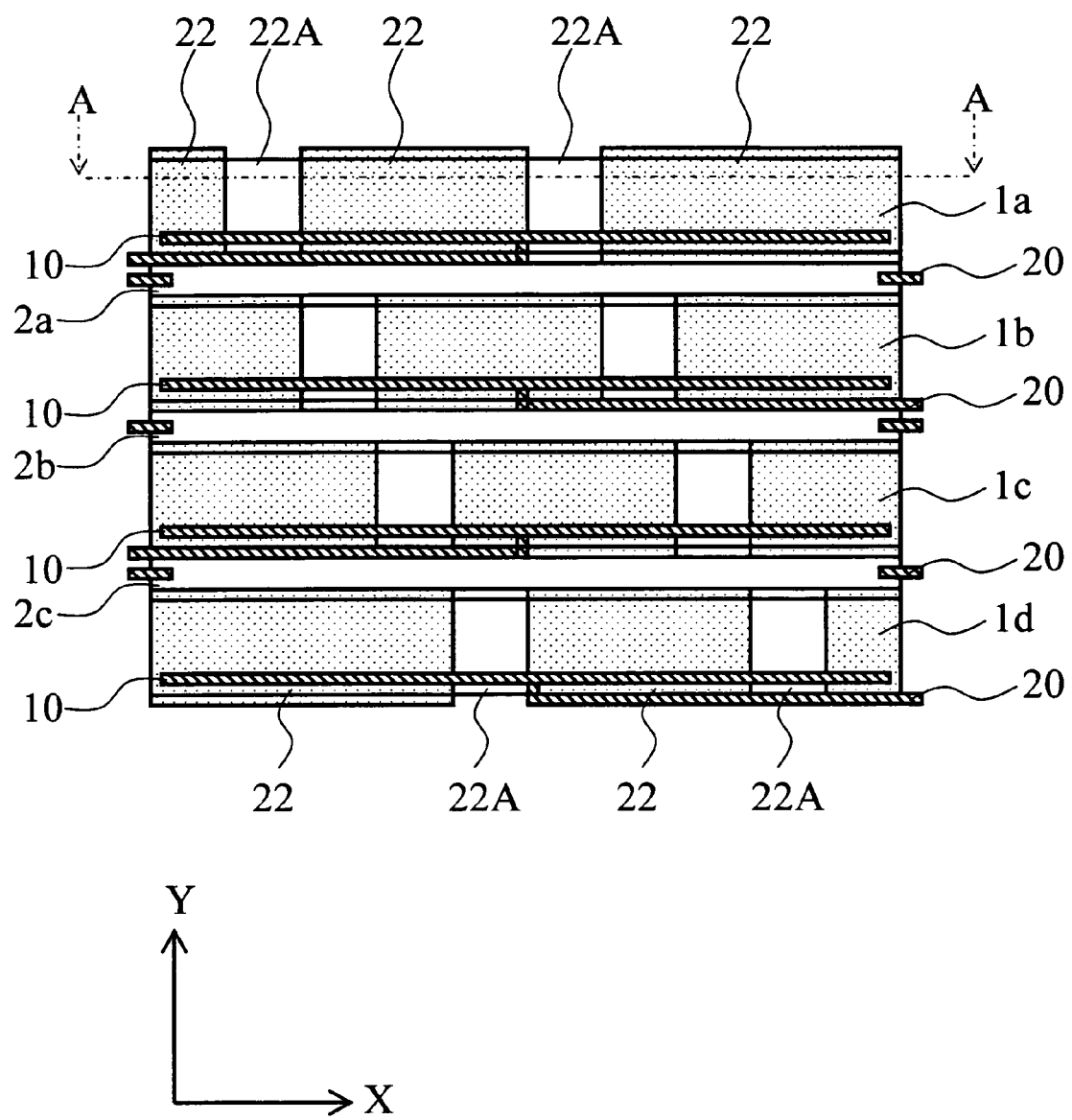
FIG. 23 is a plan perspective view showing a fourth specific example of the light receiving device that can be used in the embodiment of the invention.

FIG. 23 is a plan perspective view showing a fourth specific example of the light receiving device that can be used in this embodiment. With respect to this figure again, elements similar to those described with reference to FIGS. 1 to 22 are marked with the same numerals and are not described in detail.

This specific example ensures a large area of electrode contacts with the first photodiodes 1a to 1d. More specifically, a contact 10 extending in the x-direction is formed for each of the first photodiodes 1a to 1d. Metal wirings 20 connected to these contacts 10 are drawn out alternately in the left and right direction for the photodiodes 1a to 1d. For example, the metal wiring 20 for the photodiode 1a is drawn out to the left, and the metal wiring 20 for the photodiode 1b is drawn out to the right.

The contacts 10 are formed in a striped configuration along the longitudinal direction of the photodiodes 1a to 1d. As a result, photocurrent can be extracted uniformly along the longitudinal direction of the photodiodes 1a to 1d. The photocurrent generated in the photodiodes can thus be extracted in the contacts 10 extending along the longitudinal direction of the photodiodes. That is, photocurrent generated both in the center area and at the ends of the striped photodiodes 1a to 1d can be extracted with uniform signal intensity while suppressing any loss due to the resistance component of the photodiodes themselves.

In addition, in this specific example, the contacts 10 formed along the longitudinal direction of the photodiodes 1a to 1d serve as light shielding layers. Therefore, preferably, the contacts 10 and openings 22A are formed so that the area of the openings 22A except the portions shielded by the contacts 10 is constant. This allows the light receiving area in every opening 22A to be equal, which results in a uniform optical output. This is also the case in the structure shown in FIGS. 26, 27, and 28 described later in detail.

Figure 24:
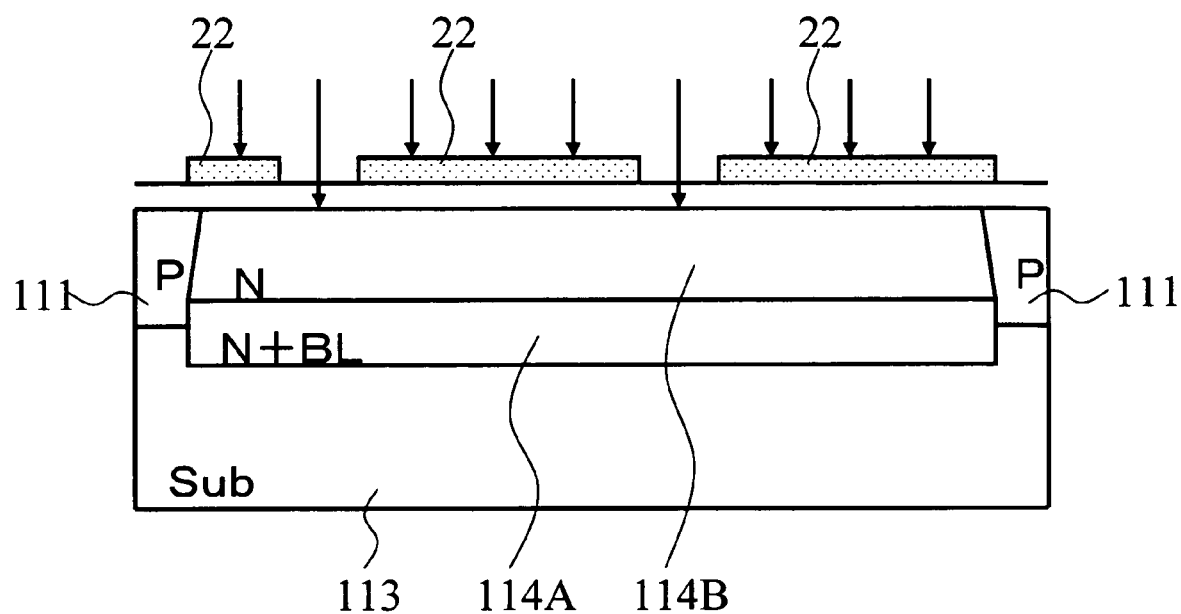
FIGS. 24 and 25 are schematic views showing a cross-sectional structure of a photodiode of the specific example of the invention.
Figure 25:
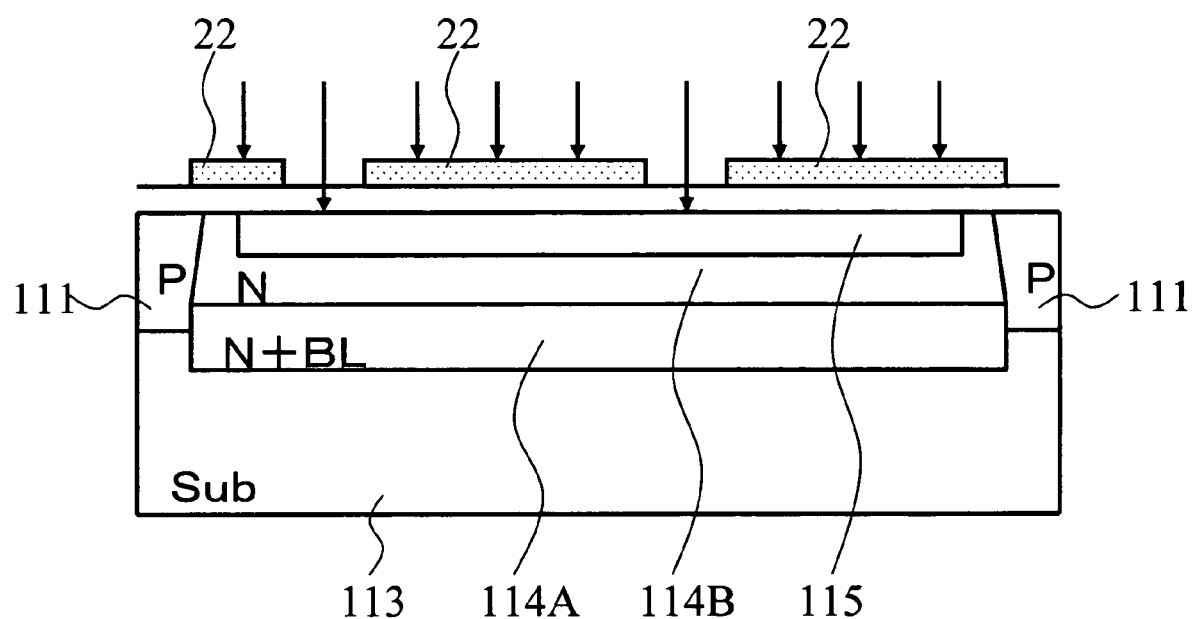

FIGS. 24 and 25 are schematic views showing a cross-sectional structure of a photodiode of this specific example. That is, these figures are cross sections along line A—A of FIG. 23.

In the structure shown in FIG. 24, an n-type epitaxial layer 114B is formed on a p-type substrate 113 via an n$^+$-type block layer 114A to form p-n junction photodiodes. The periphery thereof is separated by a p-type region 111.

In the structure shown in FIG. 25 again, an n-type epitaxial layer 114B is formed on a p-type substrate 113 via an n$^+$-type block layer 114A. A p-type diffusion region 115 is formed in the surface of the n-type epitaxial layer 114B in a planar configuration to form p-n junction photodiodes. The periphery thereof is separated by a p-type region 111.

In this specific example, contacts 10 extending along the longitudinal direction of the first photodiodes 1a to 1d are formed. As a result, photocurrent can be extracted uniformly along the longitudinal direction of each of the photodiodes. According to this specific example again, as described above with reference to FIGS. 1 to 18, outputs of the second photodiodes 2a to 2c can be used to cancel the DC component. As a result, a downsized optical encoder having high sensitivity, high dynamic range, and high resolution can be provided.

Figure 26:
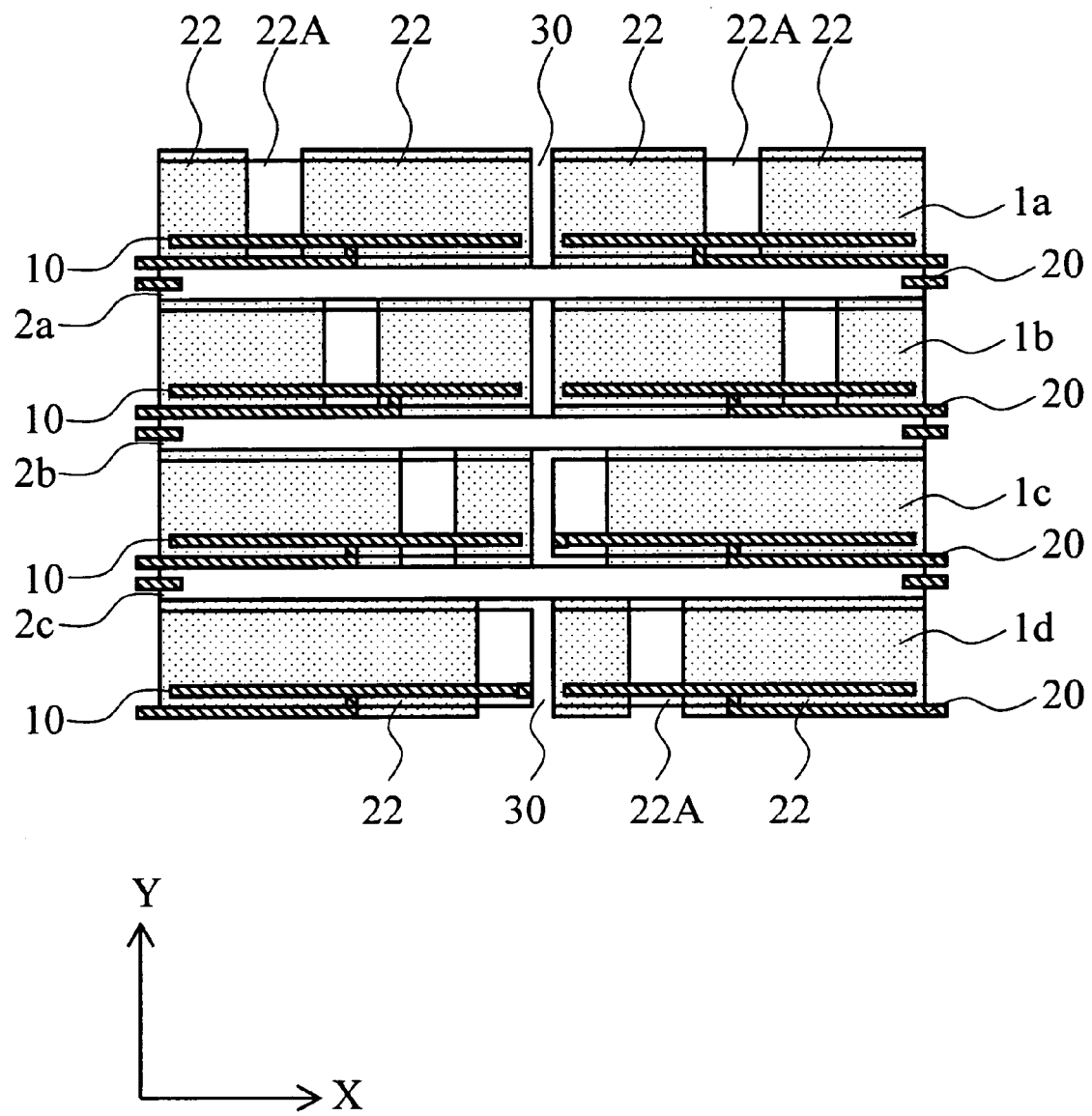
FIG. 26 is a plan perspective view showing a fifth specific example of the light receiving device that can be used in the embodiment of the invention.

FIG. 26 is a plan perspective view showing a fifth specific example of the light receiving device that can be used in this embodiment. With respect to this figure again, elements similar to those described with reference to FIGS. 1 to 25 are marked with the same numerals and are not described in detail.

In this specific example, each of the first photodiodes 1a to 1d is horizontally separated into two portions by an insulating region 30. As with the fourth specific example, a contact 10 extending along the x-direction is formed on each of the separated portions.

Each of the photodiodes 1a to 1d is separated by the insulating region 30, and the phase of the light receiving unit is shifted between its left and right sides. Consequently, as described above with reference to the second and third specific examples, any unevenness of light in the y-direction as well as the x-direction can be averaged. According to this specific example again, as described above with reference to FIGS. 1 to 18, outputs of the second photodiodes 2a to 2c can be used to cancel the DC component. As a result, a downsized optical encoder having high sensitivity, high dynamic range, and high resolution can be provided.

In addition, in this specific example again, the contacts 10 formed along the longitudinal direction of the photodiodes 1a to 1d serve as light shielding layers. Therefore, preferably, the contacts 10 and openings 22A are formed so that the area of the openings 22A except the portions shielded by the contacts 10 is constant. This allows the light receiving area in every opening 22A to be equal, which results in a uniform optical output.

In the second and third specific examples described above as well as this specific example, the first photodiode extending in a striped configuration is horizontally divided into two portions by an insulating region 30 provided in the middle of them. Here, preferably, the insulating region 30 is used to adjust the spacing between the openings 22A.

Figure 27:
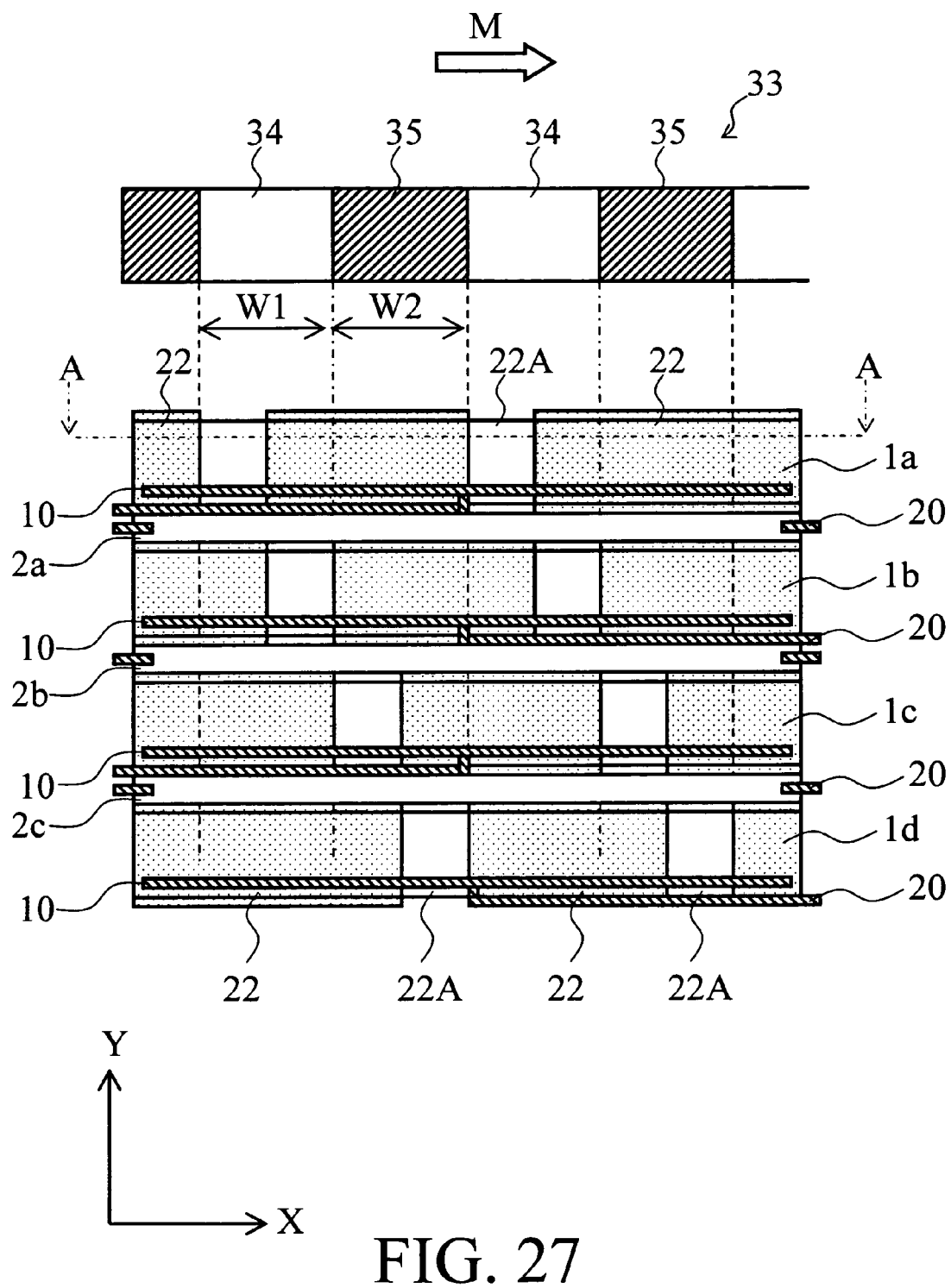
FIG. 27 is a schematic view showing the case in which the insulating region 30 is not provided.

More specifically, when no insulating regions 30 are provided as illustrated in FIG. 27, the openings 22A may be formed according to the pitch of the transmitting pattern 34 and the light shielding pattern 35 of the scale 33. In the specific example of FIG. 27, with regard to each of the photodiodes 1a to 1d, the pitch of the openings 22A is matched with the pitch of the light/dark pattern of the scale 33. That is, the width W1 of the transmitting pattern section 34 of the scale 33 and the width W2 of the light shielding pattern section 35 are each twice the width of the opening 22A.

In contrast, when the insulating regions 30 are provided, the width of the opening 22A may be preferably narrowed depending on that width.

Figure 28:
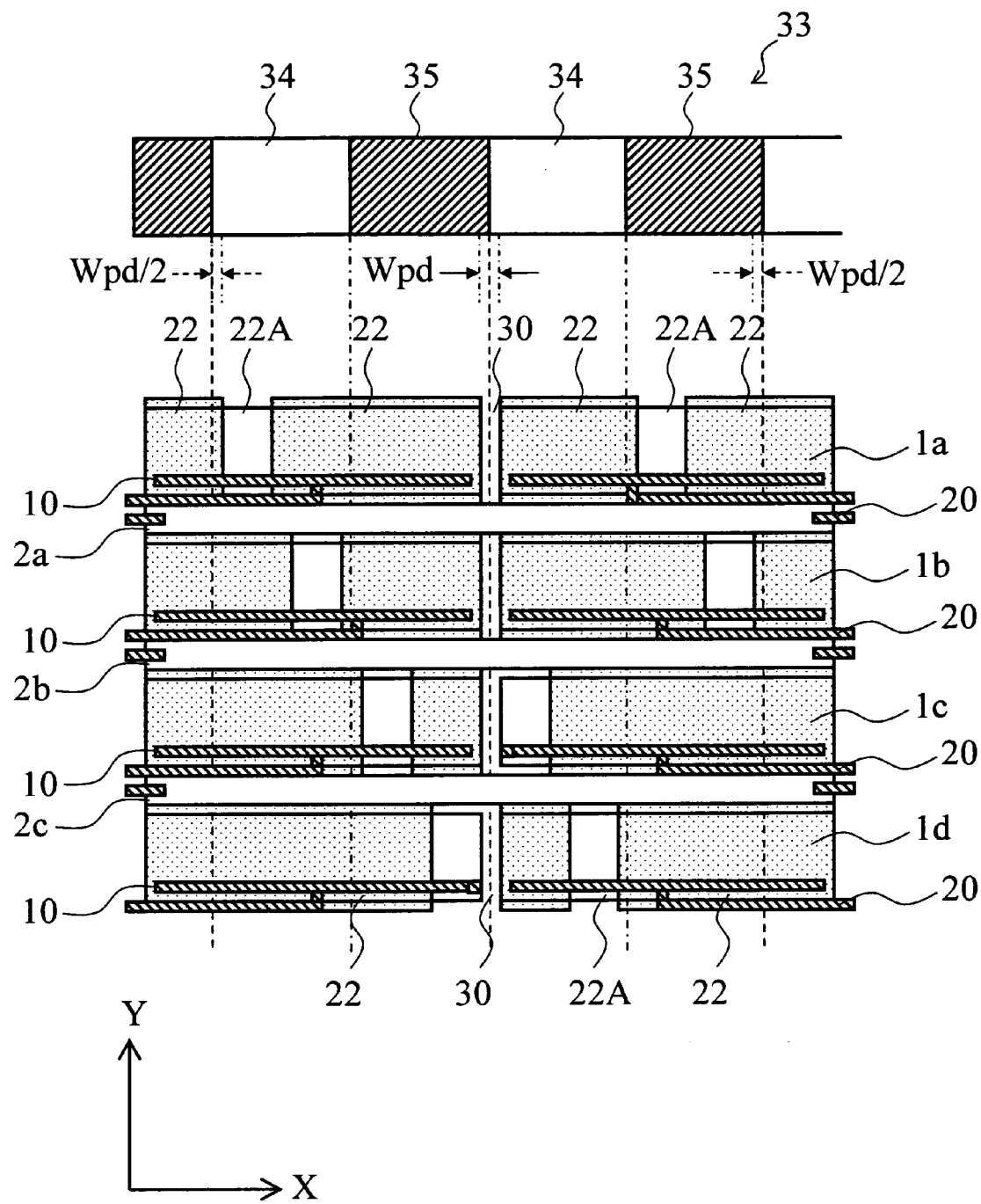
FIG. 28 is a schematic view for illustrating the width of the opening 22A in the case of the insulating region 30 being provided.

FIG. 28 is a schematic view for illustrating the width of the opening 22A in the case of the insulating region 30 being provided.

The insulating region 30 is a dead zone that detects no light. Simple interposition of such a dead zone into the pattern as shown in FIG. 27 causes a certain offset in the pitch of the openings 22A. Furthermore, interposition of the insulating region 30 without changing the pattern narrows only the surrounding openings 22A, which causes a problem of local decrease of photocurrent signals.

In contrast, in the structure shown in FIG. 28, where the width of the insulating region 30 in the x-direction is denoted by Wpd, each of the openings 22A is formed with a width narrowed by Wpd as compared to the case where no insulating regions 30 are provided (FIG. 27). That is, the pitch of the array of the openings 22A along the x-direction remains unchanged, while the width of each of the openings 22A is narrowed. The insulating region 30 is provided in a gap formed between adjacent openings 22A. In this way, photocurrent signals at the same level are obtained from any portion of the first photodiodes 1a to 1d.

Furthermore, in this case, adjacent openings 22A are not contiguous in the x-direction, but spaced apart by Wpd. For example, the opening 22A1 provided on the left portion of the first photodiode 1a and the opening 22A2 provided on the left of the first photodiode 1b are spaced apart by Wpd along the x-direction. In this way, spacings provided between adjacent openings eliminate the influence of the unevenness of light due to diffuse reflection, refraction, and diffraction of light transmitted through the scale 33, and facilitates extracting only the signals with 90-degree phase difference for each phase. That is, noise due to scattering of light can be reduced.

The embodiment of the invention has been described with reference to specific examples. However, the invention is not limited to these specific examples.

For example, FIGS. 1 and 19 show specific examples in which first photodiodes for optical signal detection and second photodiodes for DC component cancellation are alternately arranged. However, the invention is not limited thereto. That is, the second photodiodes for DC detection are not necessarily required to be provided between all adjacent pairs of first photodiodes.

Figure 29:
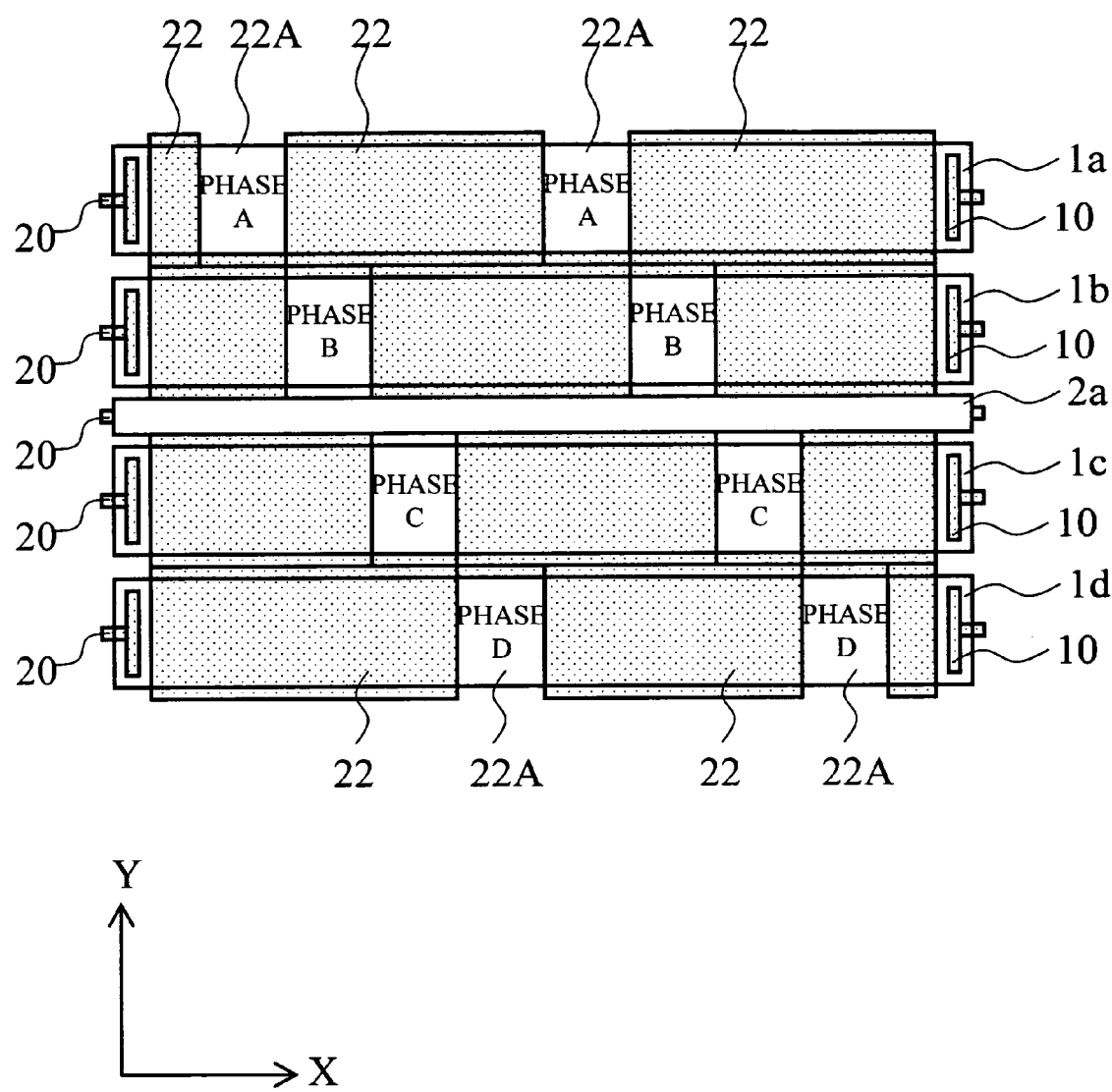
FIG. 29 is a schematic perspective view showing another specific example of the light receiving device that can be used in the invention.

FIG. 29 is a schematic perspective view showing another specific example of the light receiving device that can be used in the invention. More specifically, in this specific example, four first photodiodes 1a to 1d extending in the x-direction are provided, and in the middle of them, a single second photodiode 2a is provided. A relatively small DC component can be canceled by photocurrent obtained only from the single second photodiode 2a. The level of optical signals can be increased by decreasing the occupied area of the second photodiode and increasing by that amount the occupied area of the first photodiodes 1a to 1d. This is advantageous to noise reduction and sensitivity enhancement.

Figure 30:
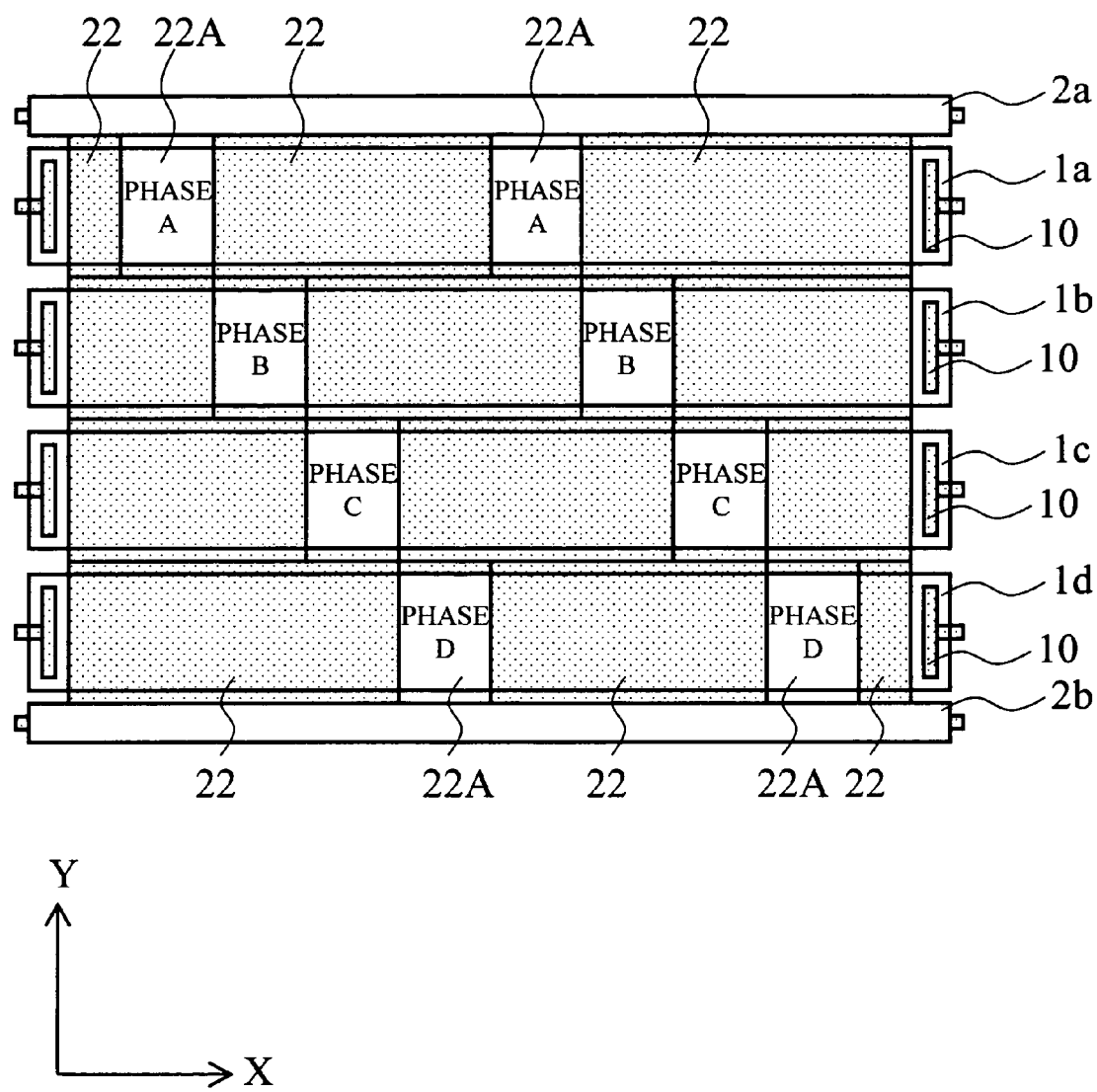
FIG. 30 is a schematic perspective view showing still another specific example of the light receiving device that can be used in the invention.

FIG. 30 is a schematic perspective view showing still another specific example of the light receiving device that can be used in the invention. More specifically, in this specific example, the first photodiodes 1a to 1d are adjacently provided, and above and below of them, second photodiodes 2a and 2b are provided. This can also remove the DC component. The level of optical signals can be increased by increasing the occupied area of the first photodiodes 1a to 1d. This is advantageous to noise reduction and sensitivity enhancement.

In addition to FIGS. 29 and 30, various specific examples can be contemplated with respect to the number and arrangement of the second photodiodes, which are also encompassed within the scope of the invention as long as they comprise the feature of the invention.

Any appropriate modification by those skilled in the art with respect to material, conductivity type, carrier concentration, impurities, thickness, positional relationship, and pattern configuration of various elements of the light emitting unit, light receiving unit, semiconductor substrate, semiconductor layer, electrodes, and circuit elements described above is also encompassed within the scope of the invention as long as it comprises the feature of the invention.

Any other configuration of the above-described optical encoder that is selected as appropriate by those skilled in the art from among known configurations is also encompassed within the scope of the invention as long as it comprises the feature of the invention.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A light receiving device for an optical encoder comprising:
    a plurality of first photodiodes juxtaposed in a first direction and extending in a second direction that is generally vertical to the first direction;
    a light shielding layer provided on the plurality of first photodiodes, the light shielding layer having openings provided so that, when a scale having a transmitting pattern and a light shielding pattern is moved along the second direction, at least one and at least another of the plurality of first photodiodes are sequentially irradiated with light transmitted through the transmitting pattern; and
    one or more second photodiodes extending in the second direction that has a portion, wherein an area of the portion irradiated with light transmitted through the transmitting pattern is generally constant when the scale is moved along the second direction.

2. A light receiving device for an optical encoder according to claim 1, wherein the openings are provided so that at least one and an adjacent one of the plurality of first photodiodes are sequentially irradiated with light transmitted through the transmitting pattern when the scale is moved along the second direction.

3. A light receiving device for an optical encoder according to claim 1, wherein a spacing along the second direction between a first opening provided on one of the plurality of first photodiodes and a second opening nearest to the first opening is substantially zero.

4. A light receiving device for an optical encoder according to claim 1, wherein each of the plurality of first photodiodes is separated into a first portion and a second portion by an insulating region provided in a center area in the second direction.

5. A light receiving device for an optical encoder according to claim 4, wherein the openings are provided so that the first portion and the second portion of each of the plurality of first photodiodes are not simultaneously irradiated with light transmitted through the transmitting pattern when the scale is moved along the second direction.

6. A light receiving device for an optical encoder according to claim 4, wherein the openings are provided so that the first portions of at least two of the plurality of first photodiodes are simultaneously irradiated with light transmitted through the transmitting pattern when the scale is moved along the second direction.

7. A light receiving device for an optical encoder according to claim 4, wherein a spacing along the second direction between a first opening provided on one of the plurality of first photodiodes and a second opening nearest to the first opening is generally equal to the width of the insulating region along the second direction.

8. A light receiving device for an optical encoder according to claim 1, wherein the second photodiode is provided between at least two of the plurality of first photodiodes.

9. An optical encoder comprising:
a light emitting unit; and
a light receiving unit provided opposite to the light emitting unit, the light receiving unit having the light receiving device including:
a plurality of first photodiodes juxtaposed in a first direction and extending in a second direction that is generally vertical to the first direction;
a light shielding layer provided on the plurality of first photodiodes, the light shielding layer having openings provided so that, when a scale having a transmitting pattern and a light shielding pattern is moved along the second direction, at least one and at least another of the plurality of first photodiodes are sequentially irradiated with light transmitted through the transmitting pattern; and
one or more second photodiodes extending in the second direction that has a portion, wherein an area of the portion irradiated with light transmitted through the transmitting pattern is generally constant when the scale is moved along the second direction.

10. An optical encoder according to claim 9, wherein the openings are provided so that at least one and an adjacent one of the plurality of first photodiodes are sequentially irradiated with light transmitted through the transmitting pattern when the scale is moved along the second direction.

11. An optical encoder according to claim 9, wherein a spacing along the second direction between a first opening provided on one of the plurality of first photodiodes and a second opening nearest to the first opening is substantially zero.

12. An optical encoder according to claim 9, wherein each of the plurality of first photodiodes is separated into a first portion and a second portion by an insulating region provided in a center area in the second direction.

13. An optical encoder according to claim 12, wherein the openings are provided so that the first portion and the second portion of each of the plurality of first photodiodes are not simultaneously irradiated with light transmitted through the transmitting pattern when the scale is moved along the second direction.

14. An optical encoder according to claim 12, wherein the openings are provided so that the first portions of at least two of the plurality of first photodiodes are simultaneously irradiated with light transmitted through the transmitting pattern when the scale is moved along the second direction.

15. An optical encoder according to claim 12, wherein a spacing along the second direction between a first opening provided on one of the plurality of first photodiodes and a second opening nearest to the first opening is generally equal to the width of the insulating region along the second direction.

16. An optical encoder according to claim 9, wherein the second photodiode is provided between at least two of the plurality of first photodiodes.

17. An optical encoder according to claim 9, further comprising a calculation circuit for performing calculation based on signals provided from the plurality of first photodiodes and signals provided from the one or more second photodiodes.

18. An optical encoder according to claim 17, wherein the calculation circuit subtracts the signals provided by the one or more second photodiodes multiplied by a constant coefficient from the signals provided by the first photodiodes.

* * * * *